(12) United States Patent
Sweatman et al.

(10) Patent No.: US 6,564,037 B1
(45) Date of Patent: May 13, 2003

(54) MULTI-USER DETECTION FOR ANTENNA ARRAY RECEIVERS

(75) Inventors: Catherine Zoe Wollaston Hassell Sweatman, Edinburgh (GB); John Scott Thompson, Edinburgh (GB); Bernard Mulgrew, Edinburgh (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/203,852

(22) Filed: Dec. 2, 1998

(30) Foreign Application Priority Data

Dec. 24, 1997 (GB) .............................................. 9727352

(51) Int. Cl.⁷ .................................................. H04B 1/00
(52) U.S. Cl. .......................... 455/63; 455/562; 342/354; 370/342
(58) Field of Search ................................. 455/427, 429, 455/12.1, 13.1, 13.3, 456, 63, 561, 562; 342/352, 354, 357.01, 373; 370/342, 329, 335; 375/324, 340, 341, 346

(56) References Cited

U.S. PATENT DOCUMENTS

| 5,689,245 A | * | 11/1997 | Noreen et al. | 370/329 |
| 5,878,037 A | * | 3/1999 | Sherman | 370/335 |
| 5,977,907 A | * | 11/1999 | Gross | 342/354 |
| 6,067,290 A | * | 5/2000 | Paulraj et al. | 370/342 |
| 6,198,925 B1 | * | 3/2001 | Lee | 342/373 |
| 6,236,834 B1 | * | 5/2001 | Poskett et al. | 455/427 |

OTHER PUBLICATIONS

Moshavi, "Multi–User Detection for DS–CDMA Communications", IEEE Communication Magazine, Oct. 1996, pp. 124–136.

Choi, "Beamforming for the multiuser detection with decorrelator in synchronous . . . " Signal Processing, vol. 60, No. 2, Jul. 1, 1997, pp. 195–211.

* cited by examiner

Primary Examiner—Quochien Vuong
(74) Attorney, Agent, or Firm—Barnes & Thornburg

(57) ABSTRACT

The present invention relates to radio communication antennas and in particular relates to multi-user detection for CDMA antenna array receivers. A reverse link (mobile to base) of a cellular direct sequence code division multiple access system is provided which increases system capacity whilst avoiding system complexity. The invention provides a method of signal detection which is based on the partitioning of users into equivalence classes by beam-forming with subsequent standard multi-user detection techniques applied within each class. Computation techniques are simplified and processing time can be considerably reduced. Furthermore, the capacity of a conventional receiver may be improved by employing multi-user detection techniques. These techniques are particularly useful for systems which involve large numbers of users. A method of operation is also disclosed.

17 Claims, 31 Drawing Sheets

MULTI-USER DETECTION FOR ANTENNA ARRAY RECEIVERS

FIELD OF THE INVENTION

The present invention relates to radio cellular mobile communications and in particular relates to multi-user detection for code division multiple access antenna array receivers.

BACKGROUND OF THE INVENTION

To cope with the increasing demand for cellular mobile communications it is necessary to find ways to increase system capacity on the reverse link whilst avoiding system complexity.

The cellular mobile communications IS-95 standard describes the use of direct sequence code division multiple access (CDMA) techniques. In such systems, each user is allocated a distinct pseudo-noise (PN) code. The signal from each user is multiplied by a respective code before transmission to the base station. All users transmit using the same radio frequency carrier. The signals from different users will arrive asynchronously due to their different locations and signals from each user may arrive asynchronously due to multipath propagation.

FIG. 1 is an algebraic representation of a CDMA communications link. The vector d contains N consecutive binary data symbols for P users. When these symbols are transmitted, they are subject to multipath distortion. This causes the receiver to observe J versions of each transmitted symbol, which arrive at different times. This effect is defined mathematically by two matrices. Multiplying d by the matrix T repeats each symbol J times. The size NPJ matrix A is diagonal. Its diagonal elements are the positive square roots of the received multipath fading powers for the NP signals received on J paths. This results in the received signal being characterised as the product ATd. The size NPJ×NPJ matrix (R/L)D represents the combined effects of beamforming and of pseudo-noise coding and decoding, where L is the CDMA processing gain. The size NPJ×NPJ matrix R is Hermitian [Horn92, p169] (R. A. Horn and C. R. Johnson, "Matrix Analysis", Cambridge University Press, Cambridge (UK), 1992.) The size NPJ×NPJ matrix D is diagonal [Horn92, p23]. The quantity y=(R/L)DATd+z/L represents the processed received signal plus background noise (the size NPJ vector z/L).

The vector y may be subject to conventional bit detection techniques, e.g. as described in [Proakis95] (J. G. Proakis, "Digital Communications (3rd Ed)", McGraw-Hill, 1995). Alternatively, the capacity of such a system may be improved by employing multi-user detection (MUD) techniques in which information about multiple users is used to detect a desired user. Another way of increasing the capacity of the system is by employing a steerable beam antenna array at the base station. This enables the multiple access interference (MAI) between users transmitting from distinctly different bearings to be reduced. However, the MAI between users transmitting from a similar bearing may not be reduced.

It is known that by using multi-user detection [Moshavi 96] (S. Moshavi, "Multi-user Detection for DS-CBMA Communications", IEEE Personal Comms Mag, Vol 34(10), October 1996, pp124–35) or antenna array receivers [Naguib94] (A. F. Naguib, A. Paulraj and T. Kailath, "Capacity Improvement with Base Station Antenna Arrays in Cellular CDMA", IEEE Trans Veh Tech, Vol 43(3), August 1994, pp 691–7), bit error rates considerably lower than those provided by the conventional detector can be achieved for the reverse link of a cellular direct sequence code division multiple access system. Results displayed in FIGS. 8a, b–16a, b confirm these findings for both Additive White Gaussian Noise (AWGN) channels and Rayleigh fading single and multipath channels. Initial beamforming followed by multi-user detection can further decrease bit error rate for these channels (see FIGS. 8b–16b), and hence increase capacity, but at a cost in complexity. FIG. 3 shows a generic receiver employing beamforming followed by multi-user detection. The system is necessarily complicated and computational requirements are high.

Several detection systems exist to provide an estimate of a vector of transmitted bits d, given an output y. The detectors under consideration are the conventional (single user) detector and four multi-user detectors, namely the linear decorrelator detector, the linear minimum mean square error (MMSE) detector, the non-linear decision feedback decorrelator and a form of subtractive interference cancellation (also non-linear). The latter four are usually described for the case of single path transmission (J=1 and T=I, where I is the identity matrix [Horn92, p6]) and in the absence of fading (D=I), that is, when y=(R/L)Ad+z/L.

In the simplest system, single-user detection is employed. The signal from a particular user is detected by correlating the received signal, which is a sum of signals from all transmitting users, with the PN code of the user. The matched filter detector estimates the transmitted bits according to the signs of the real parts of the received output y. The signals from other users interfere with the desired signal and the system capacity is limited by multiple access interference.

The linear decorrelator detector employs an inversion of an estimate of the matrix R/L in order to estimate Ad, where L is the processing gain. A positive definite Hermitian estimate of R, say R', is calculated using knowledge of the PN codes, delays, phases and array signatures of the P users. Then R'/L is inverted using the Cholesky decomposition [Horn92, p407] and the transmitted bits are estimated according to the signs of the real parts of the components of $(R'/L)^{-1}y$. Estimates of the received signal powers are not required.

The MMSE detector is represented by an NP×NP matrix C which minimises the following expression:

$$\sum_{k=0}^{NP-1} \varepsilon\left[\left\|(C\underline{y} - Ad)_k\right\|^2\right].$$

A closed form expression for C can be determined following a method suggested by [Honig95] (M. Honig, U. Madhow and S. Verdu, "Blind Adaptive Multiuser Detection", IEEE Trans. Info. Theory, Vol. 41(4), July 1995, pp954–960). The result for C is obtained as:

$$C_{MMSE}=((R/L)+(\sigma^2/L_i)A^{-2})^{-1}$$

where $\sigma^2$ denotes the background noise variance and $A^{-1}$ denotes the matrix inverse operation [Horn92, p14]. The MMSE detector takes into account both the background noise and the received signal powers. In general, the MMSE detector does not enhance the noise as much as the decorrelator and so provides a better bit error rate. Estimates of the received signal powers and the level of background noise are required.

The decision feedback decorrelator makes bit decisions in the order of decreasing received signal powers. Hence these powers need to be estimated. It employs a Cholesky decomposition to factor the positive definite Hermitian matrix R into $F^H F$, where F is a lower triangular matrix and $F^H$ is the Hermitian adjoint or transpose [Horn92, p6] of F. The filter $\sqrt{L}(F^H)^{-1}$ is applied to the sampled output y to yield:

$$\sqrt{\sqrt{L}(F^H)^{-1}y=(F/\sqrt{L})Ad+\sqrt{L}(F^H)^{-1}z/L}$$

In practice, R can be estimated and hence F. As $F/\sqrt{L}$ is lower triangular, the k-th component of $\sqrt{L}(F^H)^{-1}y$ does not contain a multiple access interference term for any other bit k'>k. So the 0-th component does not contain an MAI term due to any other bit. A decision for this bit is determined by the sign of the real part of the component. For k>0, we use feedback in the sense that the hard decisions for all bits k"<k are used to subtract the MAI from the k-th component of the output. The received signal amplitudes are required for this. Finally, a hard decision for the k-th bit is made.

Subtractive interference cancellation estimates the transmitted bits in order of decreasing received signal powers and hence requires these to be estimated. Initially, the bit estimates provided by a conventional detector are employed. For a given bit, the most recent estimates of all other transmission bits are used to generate an estimate of the MAI from which it suffers. This interference is subtracted from the signal and an updated estimate of the given bit determined by the sign of the real part of the remaining signal.

OBJECT OF THE INVENTION

The present invention seeks to provide a simple to implement base station receiver structure which possesses improved symbol detection characteristics.

STATEMENT OF THE INVENTION

In accordance with a first aspect of the invention, there is provided a radio communications system wherein an equivalence relation is defined for a set of users. This equivalence relation is used to group the users into equivalence classes. If CDMA techniques are used, the equivalence relation may be defined according to the temporal information contained in the partial cross-correlations between the PN codes. If an antenna array is incorporated into the receiver structure at the base station, the equivalence relation may be defined according to the spatial signatures of the users. Alternatively, the equivalence relation could be defined using both temporal and spatial information.

If the vectors $x_i$ and $x_j$ are the spatial signatures corresponding to users i and j, a beamforming term for these 2 users may be defined as $(x^H_i/\|x_i\|)(x_j/\|x_j\|)$. User classes may be determined so that, if user i and user j are not in equivalent classes, the absolute value of the beamforming term is small in some sense. Such terms can then be replaced by zero, which allows the multiple access interference between users in different equivalence classes to be ignored. This enables a reduction in complexity due to the beamforming.

In the case of dispersive multipath propagation, it may be possible to define more than one spatial signature per user at a particular instant. User equivalence classes may be defined as above if one multipath component (or spatial signature) per user is chosen. For example, the first or the strongest multipath components could be selected. The chosen spatial signature for user i will be denoted $x_{i,0}$.

Users may be grouped into spatial equivalence classes by choosing a beam pattern threshold $\Theta$, which lies in the following range: $0 \leq \Theta \leq 1$. User p and user i are said to be close in bearing if:

$$\|(x^H_{p,0}/\|x_{p,0}\|)(x_{i,0}/\|x_{i,0}\|)\|^2 \geq \Theta$$

A first relation '≈' between users is defined by:

user p≈user i if $\|(x^H_{p,0}/\|x_{p,0}\|)(x_{i,0}/\|x_{i,0}\|)\|^2 \geq \Theta$; and a second relation '~' between users is defined such that:
user p~user i if there is a finite sequence of users with indices $p_0, p_1, \ldots, p_Q$, whereby:

user p≈user $p_0$≈user $p_1$≈ ... ≈user $p_Q$≈user i.

This second relation is an equivalence relation and can be used to determine equivalence classes.

Equivalence classes may be used to reduce the complexity of bit detection when using multi-user detection techniques. These techniques can be applied within the classes, rather than to all users at once.

BRIEF DESCRIPTION OF THE FIGURES

In order that the present invention can be more fully understood and to show how the same may be carried into effect, reference shall now be made, by way of example only, to the Figures as shown in the accompanying drawing sheets wherein.

Note.

DETAILED DESCRIPTION OF THE PREFERRED EMBODIMENTS

There will now be described, by way of example, the best mode contemplated by the inventors for carrying out the invention under multipath and single path conditions. In the following description, numerous specific details are set out in order to provide a complete understanding of the present invention. It will be apparent, however, to those skilled in the art, that the present invention may be put into practice with variations of the specific.

Figure 1:
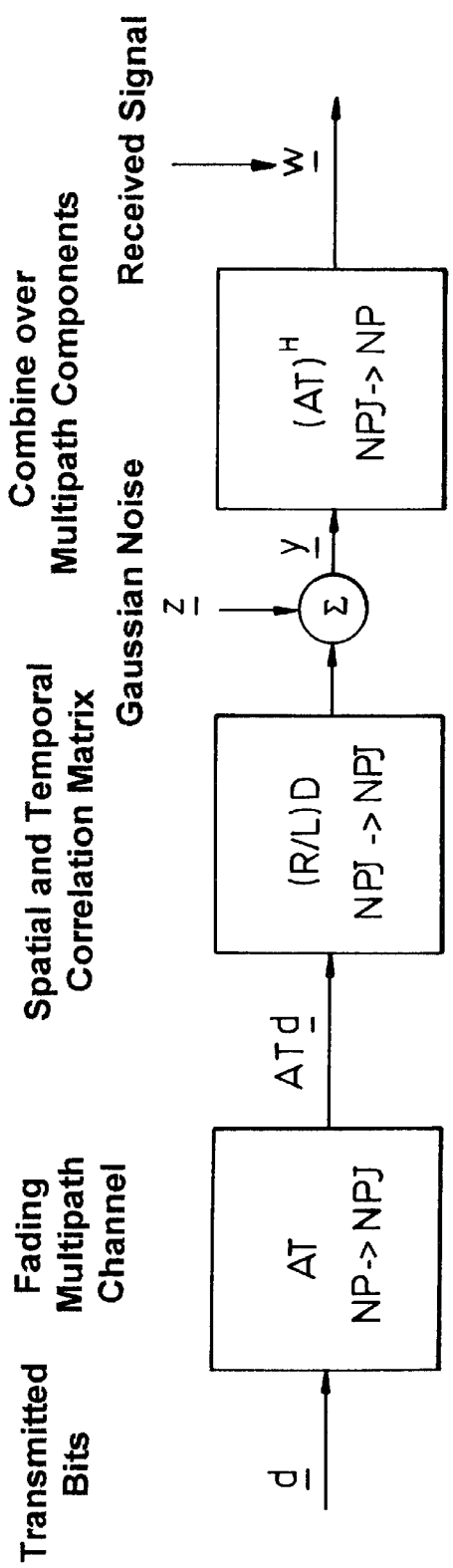
FIG. 1 is an algebraic representation of a prior art CDMA antenna array system.
Figure 2:
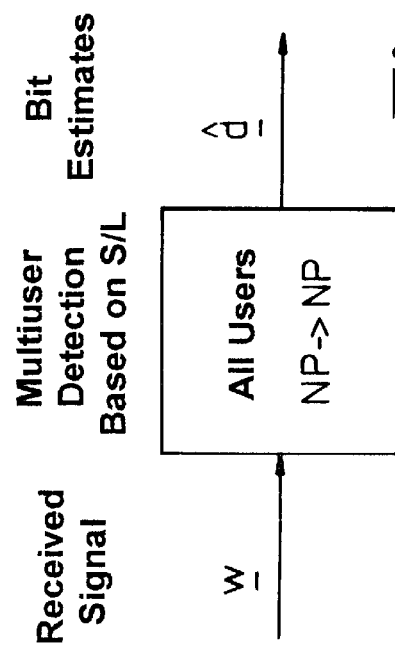
FIG. 2 is an algebraic representation of CDMA multi-user detection applied to all users in the CDMA receiver of FIG. 1.
Figure 3:
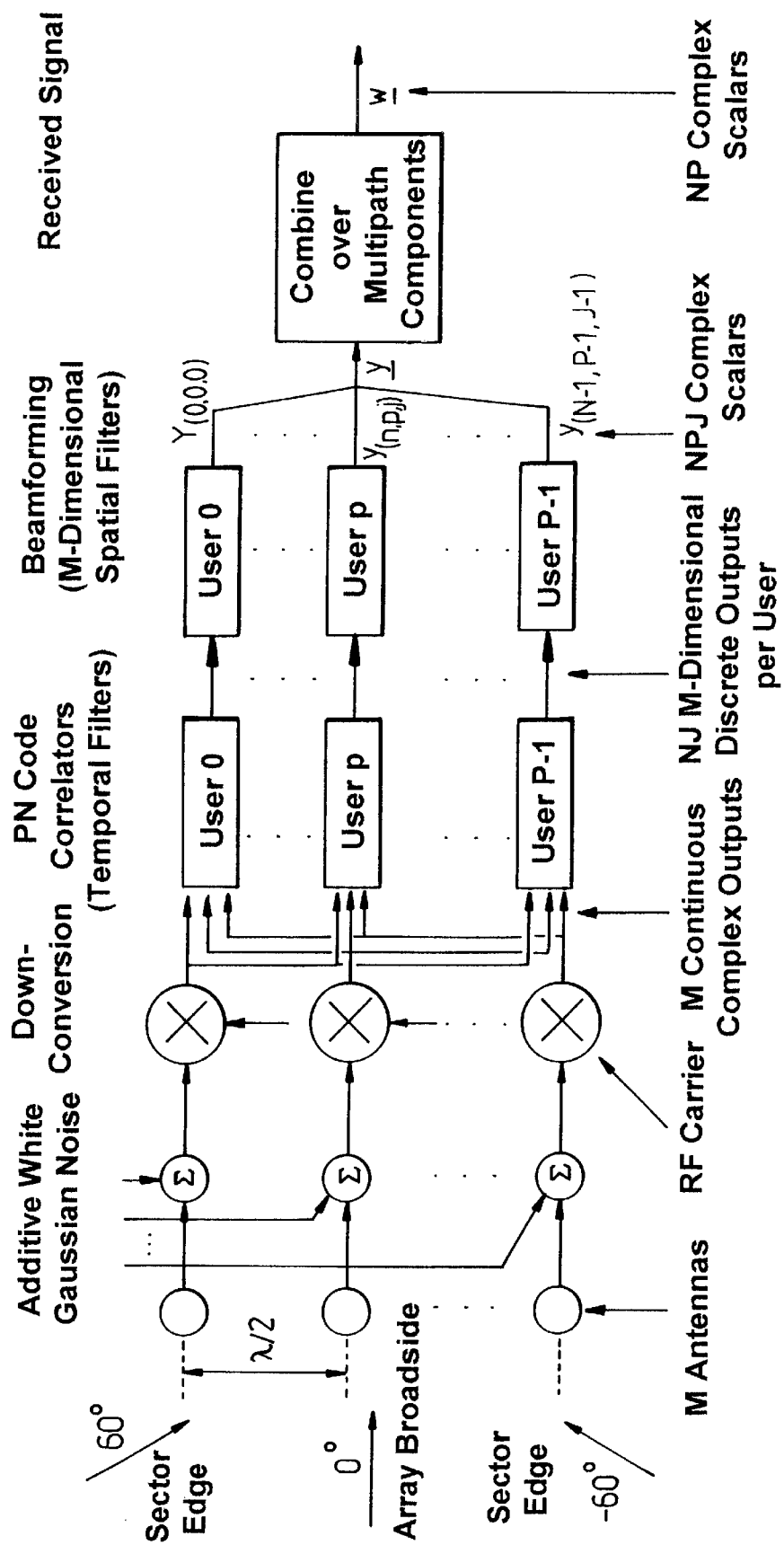
FIG. 3 shows a prior art CDMA antenna array receiver.
Figure 4:
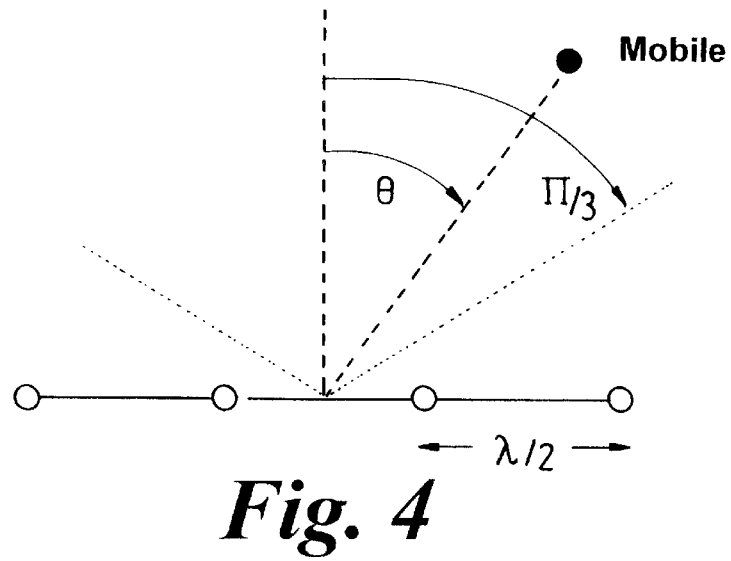
FIG. 4 shows a four element uniform linear antenna array.
Figure 5:
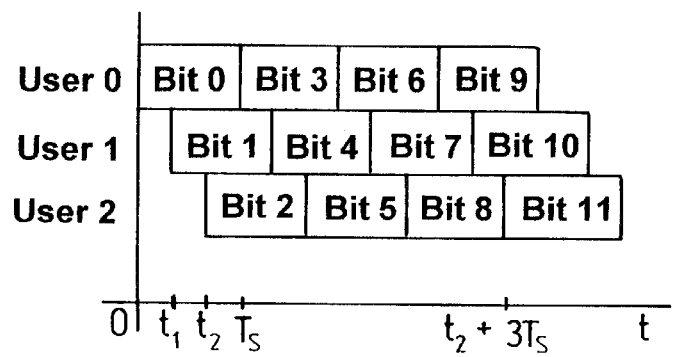
FIG. 5 shows a timing diagram for 3 users in a direct sequence signal processing system.

Referring now to FIG. 4, a uniform linear antenna array of a telecommunications base station receives signals from an outstation (only one is shown for reasons of clarity) within the area of coverage of the base station. FIG. 5 shows a timing diagram for three users employing direct sequence spread spectrum signals and binary phase shift keying. For a number, P, of users (mobiles), the p-th mobile will be able to generate a binary data sequence $d_p(t)$, $0 \leq p \leq P-1$. Each symbol has a period of $T_s$ seconds. Each bit for user p is multiplied by the PN code of the user, $c_p(t)$, which is a sequence of "chips" with values ±1, each with period $T_c$. The processing gain, L, is determined by the ratio: $L=T_s/T_c$. The transmitted radio frequency signal for the p-th user, $s_p(t)$, is given by:

$$s_p(t)=A_p d_p(t)c_p(t)\sin(2\pi ft)$$

where f denotes the radio frequency of the carrier (with associated wavelength $\lambda$) and $A_p$ denotes the signal amplitude. Uplink transmissions are taken to be asynchronous, the transmitted signal may be subject to fading and multipath propagation. The use of the PN code $c_p(t)$ permits the base station to resolve multipath components separated by $T_c$ seconds.

In the following, the general case of a base station antenna array receiver, operating in a multipath fading environment, is considered.

By way of example, consider a base station receiver with three uniform linear arrays, each array consisting of M antennas with spacing $\lambda/2$ and each covers a single 120° ($2\pi/3$ radians) sector. In this case, the (normalised) response of the array to a unit impulse from a bearing $\theta$ is the vector $a(\theta)$ whose m-th component is equal to:

$$(1/\sqrt{M})\exp(j(m-1)\pi \sin(\theta))$$

Using an antenna spacing of $\lambda/2$ ensures that the mapping: $\theta => a(\theta)^-$ is one-to-one for $\theta \in (-\pi/3, \pi/3)$ radians, whilst the scaling factor $(1/\sqrt{M})$ensures that $a^H(\theta)a(\theta)=1$.

Consider a scenario where multipath propagation exists, and each multipath arrives from a single bearing. The baseband signal received at the base station antenna array can be expressed as:

$$r(t) = \sum_{p=0}^{P-1}\sum_{jp=0}^{Jp-1} \alpha_{p,jp} d_p(t-t_{p,jp})c_p(t-t_{p,jp})\exp(j\phi_{p,jp})(t)a(\theta_{p,jp})(t) + \underline{v}(t),$$

where $\alpha_{p,jp}=A_p X_{p,jp}$; $X_{p,jp}$ is the channel attenuation, $\phi_{p,jp}$ denotes the received signal phase shift; $t_{p,jp}$ denotes the time delay for the $j_p$-th multipath component of the p-th user; and, $\underline{v}(t)$, a complex vector, represents additive noise.

To simulate more general Rayleigh fading multipath channels, which permit each multipath to be scattered in angle, the model described in [Salz94] (J. Salz and J. H. Winters, "Effect of Fading Correlation on Adaptive Arrays in Digital Mobile Radio", IEEE Trans Veh Tech, Vol 43(4), November 1994, pp1049–57) is used. This model takes into account correlations between antenna elements, the antenna spacing and the signal scattering angles. The quantity exp $(j\phi_{p,jp})(t)a(\theta_{p,jp}(t)$ is replaced by:

$$x_{p,jp}(t) = \sum_{m=1}^{M} \zeta_m (\omega_m/M)^{1/2} \eta_m$$

where $\zeta_m$ is CN (0,1), a complex normal random variable, $1 \leq m \leq M$;

$\eta_m$, $1 \leq m \leq M$, are the normalised eigenvectors of $E[x_{p,jp}(t)x_{p,jp}(t)^H]$; and, $\omega_m$, $1 \leq m \leq M$, are the corresponding eigenvalues. Taking these factors into account, the received baseband signal can be expressed as:

$$r(t) = \sum_{p=0}^{P-1}\sum_{jp=0}^{Jp-1} \alpha_{p,jp} d_p(t-t_{p,jp})c_p(t-t_{p,jp})x_{p,jp}(t) + \underline{v}(t) \quad (1)$$

To detect the $j_p$-th multipath component for the n-th bit of the p-th user, the continuous received vector r(t) is passed through a temporal filter matched to the PN code $c_p(t)$ and a spatial filter matched to a scaled version of the array signature $x_{p,jp}(t)$, which can be expressed as:

$$x_{p,jp}(t)/\|x_{p,jp}(t)\|=x_{p,jp}(t)/(x_{p,jp}(t)^H x_{p,jp}(t))^{1/2}.$$

This yields a discrete output sampled at the bit rate. Since a single message may contain many bits, the message can be divided into groups of N bits, where N is a fairly small integer, e.g. $N \leq 10$, and NP symbols (bits) can be decorrelated at a time. For simplicity, it is assumed that $J_p=J$, $0 \leq p<P$. If $d_{Pn+p}(n)$ is the n-th transmitted bit from the p-th user and $y_{n,p,j}$ is the corresponding output detected on the j-th path, $0 \leq n<N$, $0 \leq p<P$, $0 \leq j<J$, then:

$$y=(RDATd+z)/L,$$

where R is a positive definite Hermitian matrix of size NPJ×NPJ, whose (nPJ+pJ+j, n'PJ+p'J+j')-th entry is defined as;

$$R_{(n,p,j)(n',p',j')}=(x^H_{n,p,j}/\|x_{n,p,j}\|)(x_{n',p',j'}/\|x_{n',p',j'}\|)\rho_{(n,p,j)(n',p',j')}.$$

Here, $x_{n,p,j}$ is the discrete time representation of $x_{p,j}(t)$;

$\rho_{(n,p,j)(n',p',j')}$ is the partial cross-correlation for the PN codes of the n-th bit from user p on the j-th path and the n'-th bit from user p' on the j'-th path, assuming $\rho_{(n,p,j)(n,p,j)}=L$;

D is a diagonal matrix whose entries are the fading amplitudes $\|x_{n,p,j}\|$;

A is a diagonal matrix with diagonal entries $A_{(n,p,j)(n,p,j)} = \alpha_{p,j}$;

Td is a stretched version of d in which each component of d is repeated J times; and, z represents noise and $E[zz^H]=\delta^2 R$, assuming that there is Gaussian noise at the antenna outputs.

To combat the effects of fading and to reduce the dimension of the problem from JNP to NP, the outputs are multiplied by their corresponding amplitudes and the multipath components are summed to obtain an output:

$$w=(1/L)(AT)^H RDATd+1/L(AT)^H z.$$

If $S=(AT)^H RDAT;$ and $n=(1/L)(AT)^H z$ then: $w=(S/L)d+n.$

The matrix S/L represents the transformation from the vector of transmitted bits d to the processed received signal w. Vector w will be an approximation to $(AT)^H DATd$ which can be written as Pd, where P is a diagonal matrix whose entries are the sums of the average received powers of multipath signal components weighted by the fading amplitudes.

The vector d is estimated using the processed received signal w. It is possible to estimate d using an alternative signal w' where:

$$w'=(1/L)(AT)^H DRDATd+(1/L)(AT)^H Dz.$$

If: $S'=(AT)^H DRDAT;$ and: $n'=(1/L)(AT)^H Dz;$ then: $w'=(1/L)S'd+n'.$

Estimating S' requires less computation than estimating S as no normalisation of array signatures is required. Also, S' is Hermitian and positive definite, which is an advantage when applying multi-user detection requiring matrix inversion. In this case a Cholesky decomposition can be used to obtain a lower triangular matrix L, where $S'LL^H$, instead of a more general $\mathcal{LU}$ decomposition, where $\mathcal{L}$ is a lower triangular matrix and $\mathcal{U}$ is an upper triangular matrix.

However:

$$E[n'(n')^H]=(\delta^2/L)(S'/L);$$

and thus depends upon the fading amplitudes, whereas:

$$E[nn^H]=(\delta^2/L)(\check{S}/L);$$

where $\check{S}=(AT)^H RAT;$ and so does not.

The fading suffered by w' is more exaggerated than that suffered by w. The bit error rates obtained by estimating d from w' are generally much higher than those obtained using w.

The problem considered in this document arises in the estimation of d, given the received signal:

$$w=(S/L)d+n$$

The present approach provides a way of reducing the calculation involved in applying multi-user detection techniques after beamforming. A single large problem is split into a number of smaller problems. It requires a partition of the users into equivalence classes. The description given below is based on the use of spatial equivalence classes.

In the case that N, the number of bits per user, is small; for $0 \leq p<P$, $0 \leq j<J$, it is reasonable to suppose the spatial (array) signatures are constant over the time interval in question and if it is set such that:

$$x_{n,p,j}=x_{p,j}, 0 \leq n<N,$$

an equivalence relation on the set of users can be defined based on the spatial signatures $x_{p,0}$ where $0 \leq p<P$.

Figure 6:
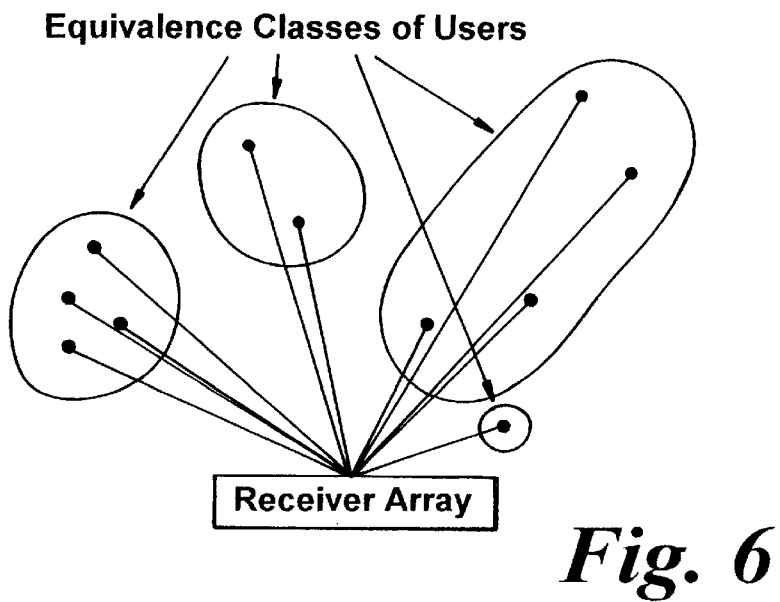
FIG. 6 shows a set of user equivalence classes.

Equivalence classes are determined so that, if user p and user i are not equivalent, the absolute value of $(x^H_{p,0}/\|x_{p,0}\|)(x_{i,0}/\|x_{i,0}\|)$ is small in some sense. In this case it is reasonable to assume that $(x^H_{p,j}/\|x_{p,j}\|)(x_{i,j'}/\|x_{i,j'}\|)$ is also small, $0 \leq j, j' \leq J$. By replacing each such small term (in R) by zero, the multiple access interference between equivalence classes can be ignored. This reduces the complexity of multi-user detection applied after beamforming. The problem is thus split into a number of small calculations. FIG. 6 depicts the partitions of users into equivalence classes.

The users are sorted into equivalence classes based on the beam patterns according to a beam pattern threshold, $\Theta$, where $0 \leq \Theta \leq 1$. User p and user i are close in bearing if:

$$\|(x^H_{p,0}/\|x_{p,0}\|)(x_{i,0}/\|x_{i,0}\|)\|^2 \geq \Theta \qquad (2)$$

If user p and user i are close in bearing, they are in the same equivalence class. Further, if there exists a finite sequence of users, say user p, user $q_0$, user $q_1, \ldots$ user $q_n$, user i, such that any two adjacent users in the sequence are close in bearing, user p and user i are in the same equivalence class. Therefore, it is possible that two users in the same equivalence class are not close in bearing. However, users in different equivalence classes cannot be close in bearing (according to $\Theta$).

Specifically, a relation '$\approx$' between users is defined by:

user $p \approx$ user $i$ if $\|(x^H_{p,0}/\|x_{p,0}\|)(x_{i,0}/\|x_{i,0}\|)\|^2 \geq \Theta$.

A relation '$\sim$' between users is defined such that:

user $p \sim$ user $i$ if there is a finite sequence of users with indices $p_0, p_1, \ldots, p_Q$, whereby:

user $p \approx$ user $p_0 \approx$ user $p_1 \approx \ldots \approx$ user $p_Q \approx$ user $i$.

Note that the relation $\approx$ is symmetric and reflexive but not transitive and this is therefore not an equivalence relation. The relation $\sim$ is symmetric, reflexive and transitive and is hence an equivalence relation. By increasing the beam pattern threshold $\Theta$ we can decrease the number of users in the equivalence classes. If there are a large number of users who are fairly equally but closely spaced in bearing, a fairly high threshold should be choosen to obtain a practical number of equivalence classes. If $\Theta=0$ then only one class can be obtained.

For a number, E, of equivalence classes and a number $P_e$ of users in the e-th class, then $$\sum_{e=1}^{E} P_e = P.$$

$\mathbb{C}^{NP}$ can be written as a direct sum, namely:

$$\mathbb{C}^{NP} = \mathbb{C}^{NP1} \oplus \mathbb{C}^{NP2} \oplus \ldots \oplus \mathbb{C}^{NPE}$$

where $\mathbb{C}^{NPe}$ is used to represent the N bits transmitted by the users in the e-th class. The problem of multi-user detection is split into E smaller problems by considering the restriction to $\mathbb{C}^{NPe}$, $1 \leq e \leq E$, which restriction to the e-th equivalence class is denoted by:

$$w_e = (S_e/L)d_e + n_e$$

The vectors and matrices contained in this equation model the signal components for the users in the e-th equivalence class only. The effects of the other users in the other (E−1) classes are modelled as noise and are included in the noise vector $n_e$.

When a signal is transmitted from a base-station to a mobile radio station and vice versa, the signal is reflected from buildings and the like so that multiple images of a desired signal arrive at different times. This is known as multipath propagation. In addition, transmitted signals are subject to fading. For completeness and simplicity, the situation in which no reflections occur (the single path case), and in which Rayleigh fading is absent, will be discussed below.

For the special case of single path transmission without scattering, the number of multipath components, $J_p$, is set to one for all users and a single bearing can be assigned to each user: the bearing of the p-th user will be $\theta_p$. Thus, the received base-band signal at the base station antenna array can for this case be written:

$$\underline{r}(t) = \sum_{p=0}^{P-1} \alpha_p d_p(t-t_p) c_p(t-t_p) \exp(j\phi_p) \underline{a}(\theta_p) + \underline{v}(t) \quad (3)$$

a special case of equation (1). A signal scenario corresponding to equation (3) is simply a special case of equation (1) and may be processed following the same procedure described above for the case of equation (1). Alternatively it is simpler to work with the output:

$$y = (R/L)Ad + z/L$$

rather than with w which is obtained from y by premultiplying by $A^H$.

There are a number of alternative approaches to determining equivalence classes for a set of P users. Quantifying the relationship between users and choosing a threshold value for this measurement enables an equivalence relation (and hence equivalence classes) to be defined. The relationship between users may be measured in various ways. Given one choice of measurerment, the threshold may be varied. For example, the measurement can based purely on the correlation of the vectors $x_{i,0}$ and $x_{p,0}$, as in equation (2). Some other ways in which the relationship between users can be quantified are given below:

(a) The left-hand side (LHS) of equation (2) may be scaled by the cross-correlation value of the two PN-codes corresponding to the 0-th multipath of user i and user p for the N symbols that are being demodulated. This corresponds to averaging the quantity $(\rho_{(n,i,0)(n,p,0)}/L)$ over the N symbols. The code correlation levels are likely to change more rapidly than the users' spatial signatures, so the equivalence classes may need to be updated more rapidly to reflect this.

(b) The threshold operation in equation (2) may be modified to incorporate the cross-correlation values of all $J_i$ multipath vectors for user i and $J_p$ multipath vectors for user p. One option is to sum the $(j_i J_p)$ quantities $\|(x^H_{p,j}/\|x_{p,j}\|)(x_{i,k}/\|x_{i,k}\|)\|^2$ for all the possible values of the two users multipath component indices j and k. The result can be normalised by the scalar $(J_i J_p)$ and used to replace the LHS of equation (2).

(c) An alternative to option (b) is to evaluate the $(J_i J_p)$ correlations and retain only the largest correlation value. This value may be used to replace the LHS of equation (2).

(d) The measurement may be based purely on the cross-correlation value of the two PN-codes corresponding to the 0-th multipath of user i and user p for the N symbols that are being demodulated.

(e) An alternative to option (d) is to evaluate the $(J_i J_p)$ PN code correlations and either average over the values or retain only the largest correlation value. This value may be used to replace the LHS of equation (2).

Figure 7:
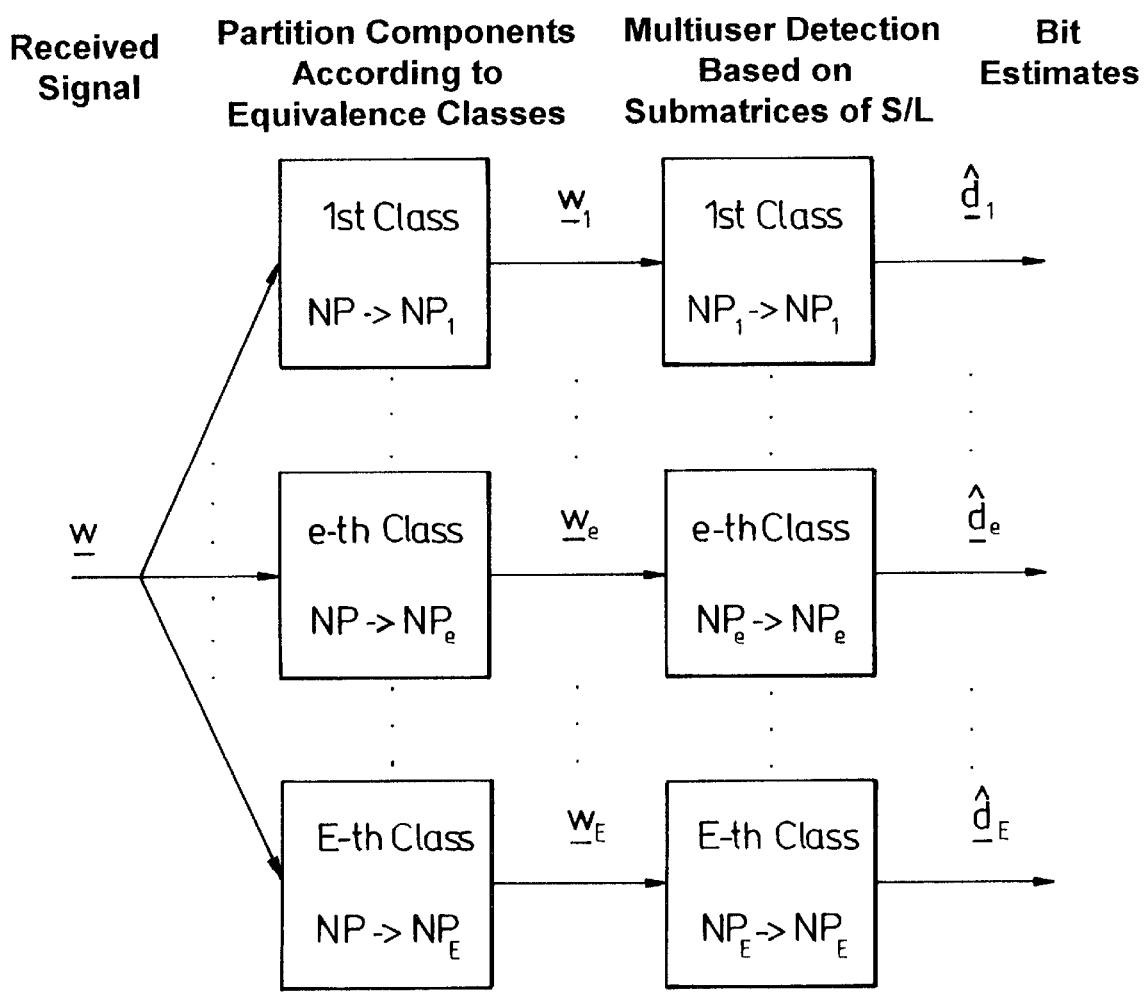
FIG. 7 is an algebraic representation of CDMA multi-user detection applied to user equivalence classes.
Figure 8A:
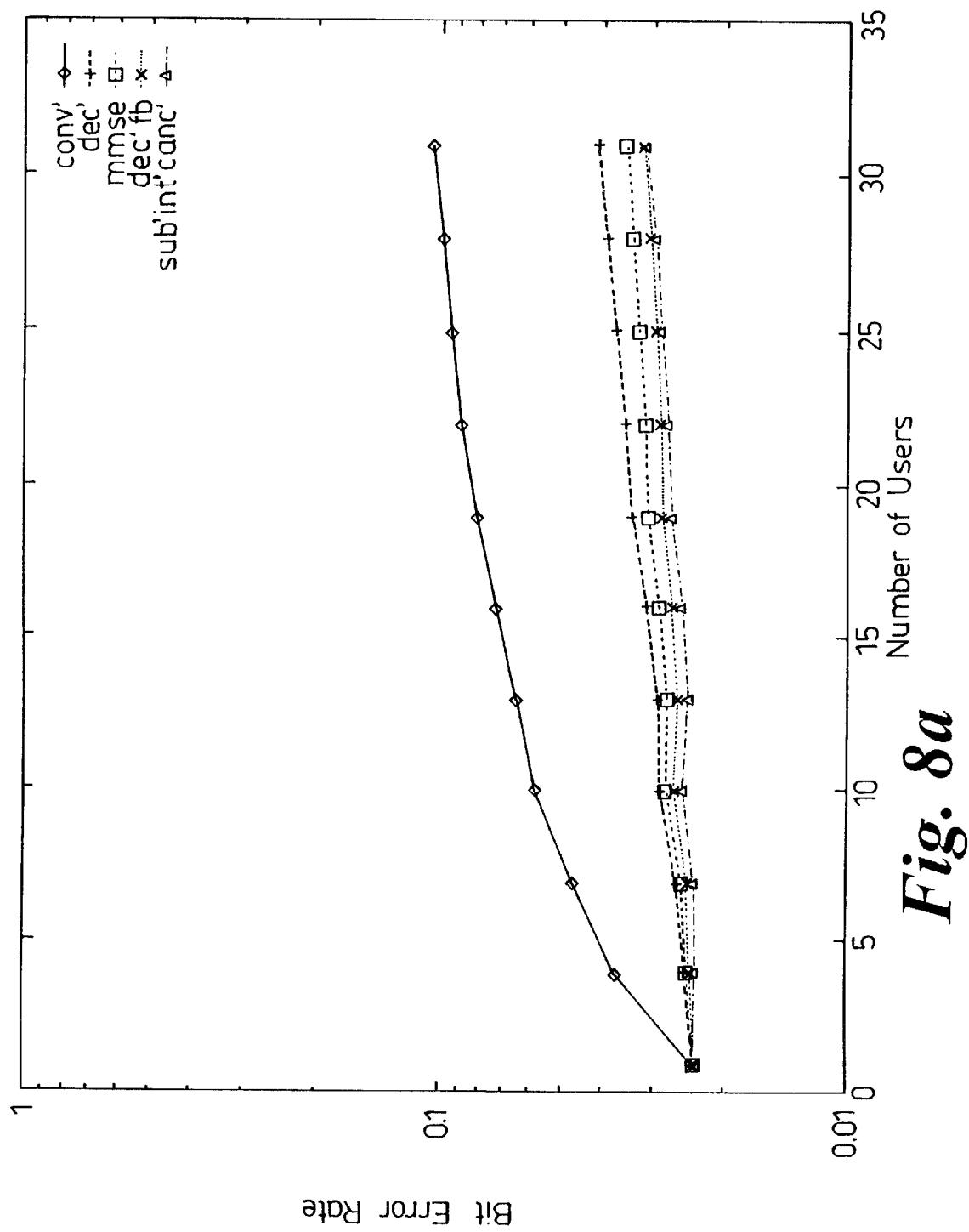
FIGS. 8a, b, c show a graphical comparison of performance in terms of bit error rate versus number of users for various detectors under single path fading propagation conditions at 10 dB signal-to-noise ratio (SNR)
Figure 8B:
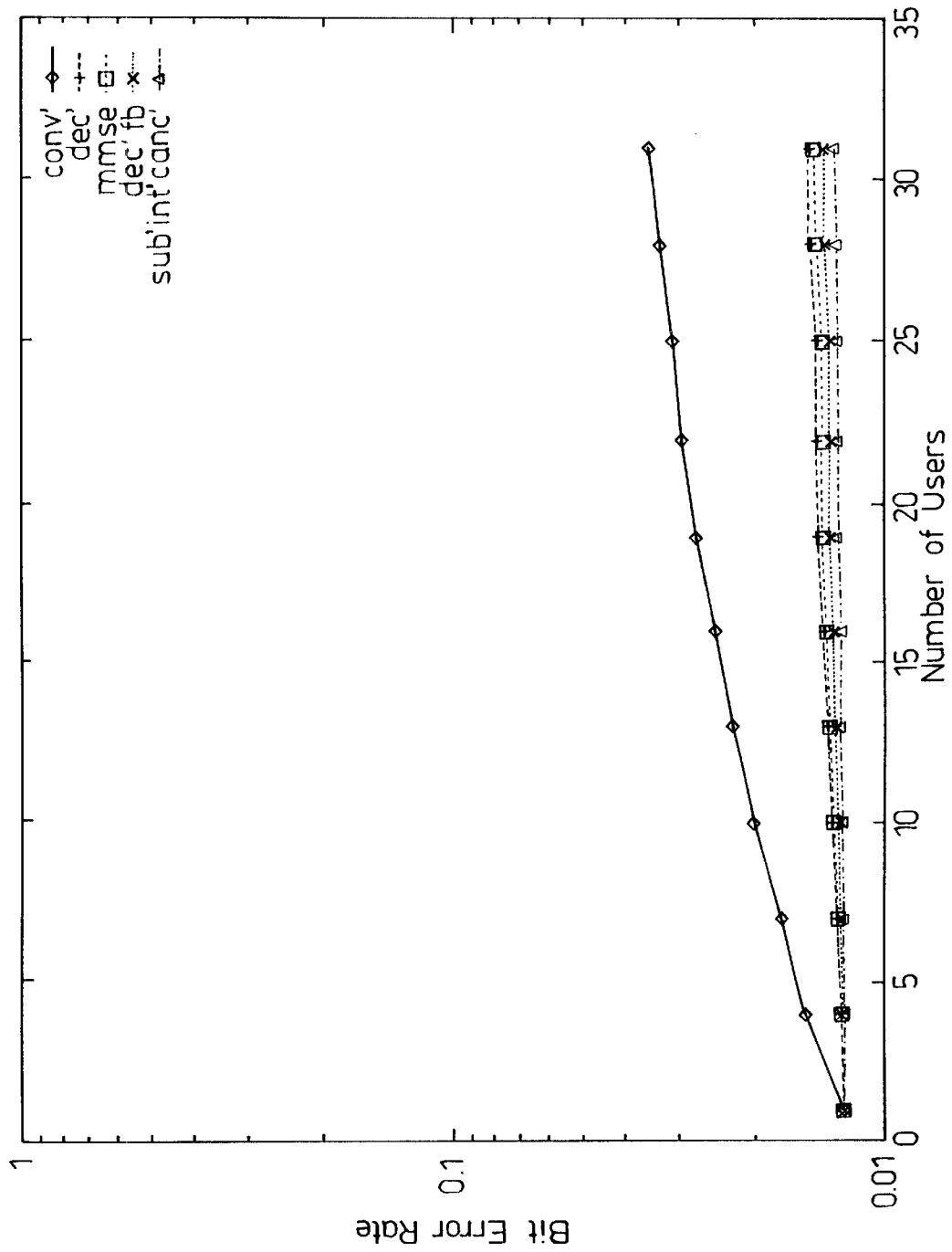
In FIGS. 8–16, reference (a) refers to a single antenna receiver (array size M=1), reference (b) refers to a multiple antenna array receiver (M=4) and reference (c) refers to a multiple antenna array receiver employing the equivalence classes approach.
Figure 8C:
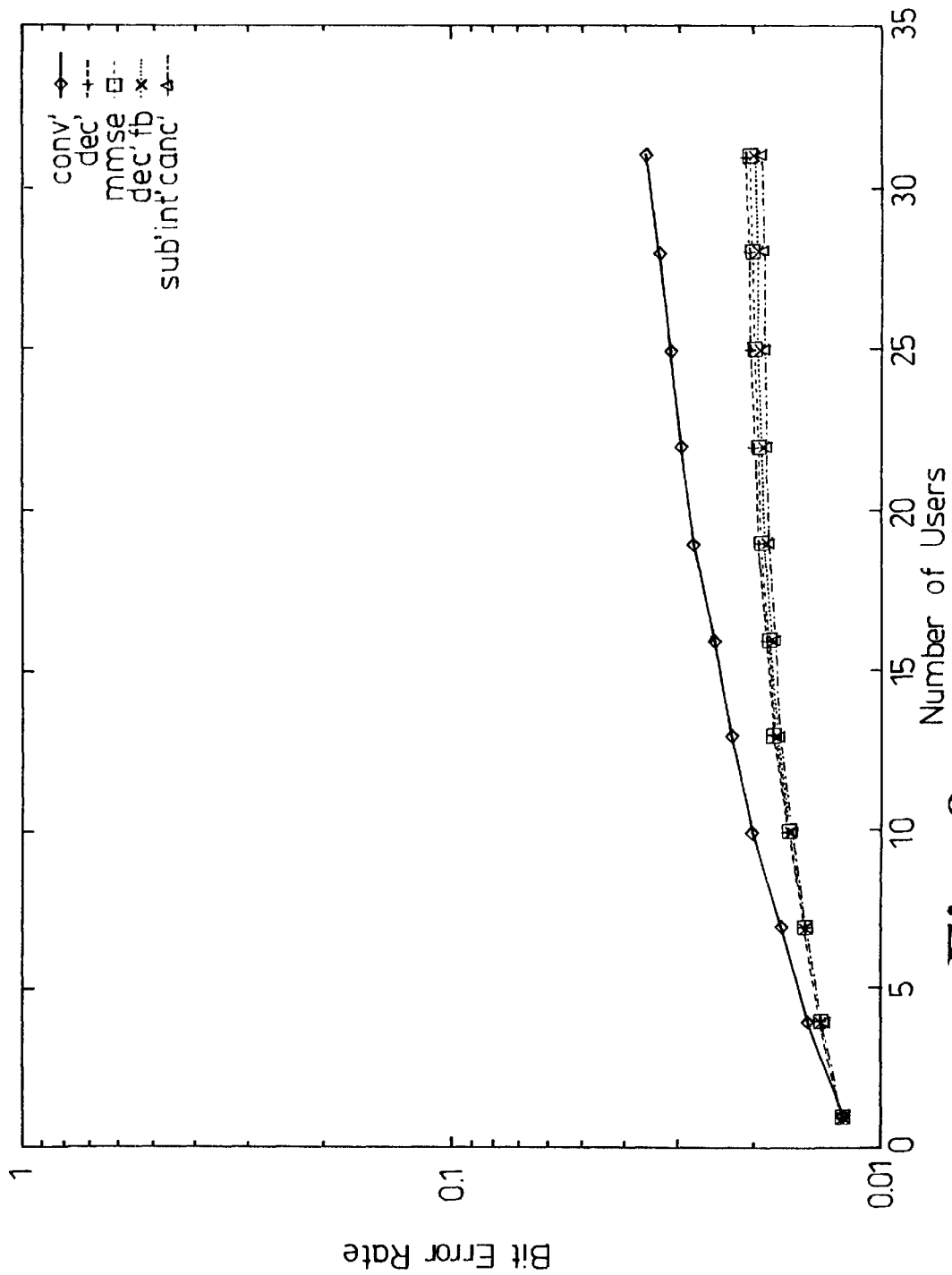
Figure 9A:
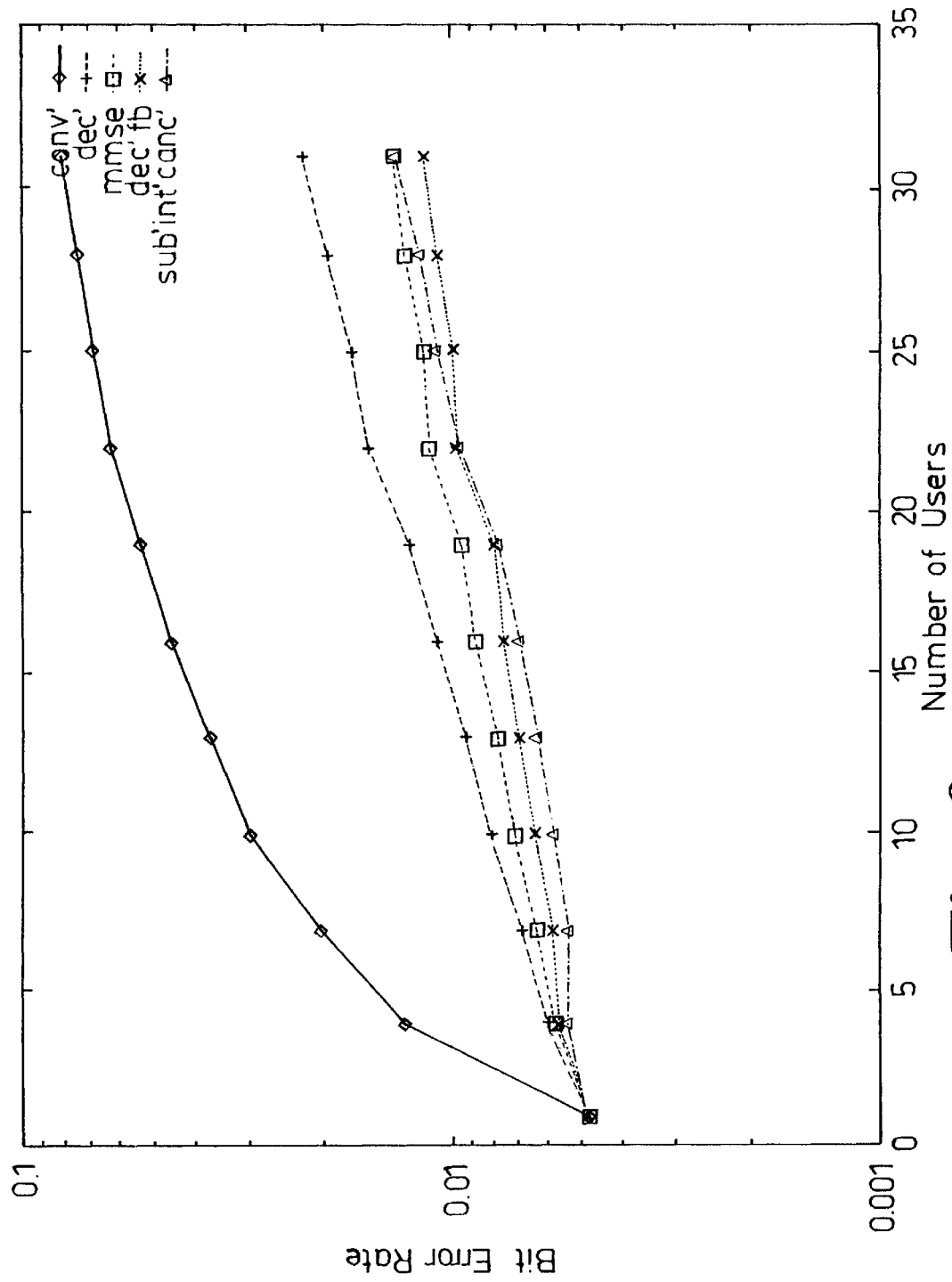
FIGS. 9a, b, c show a graphical comparison of performance in terms of bit error rate versus number of users for various detectors under multipath (J=3) fading propagation conditions at 10 dB SNR;)
Figure 9B:
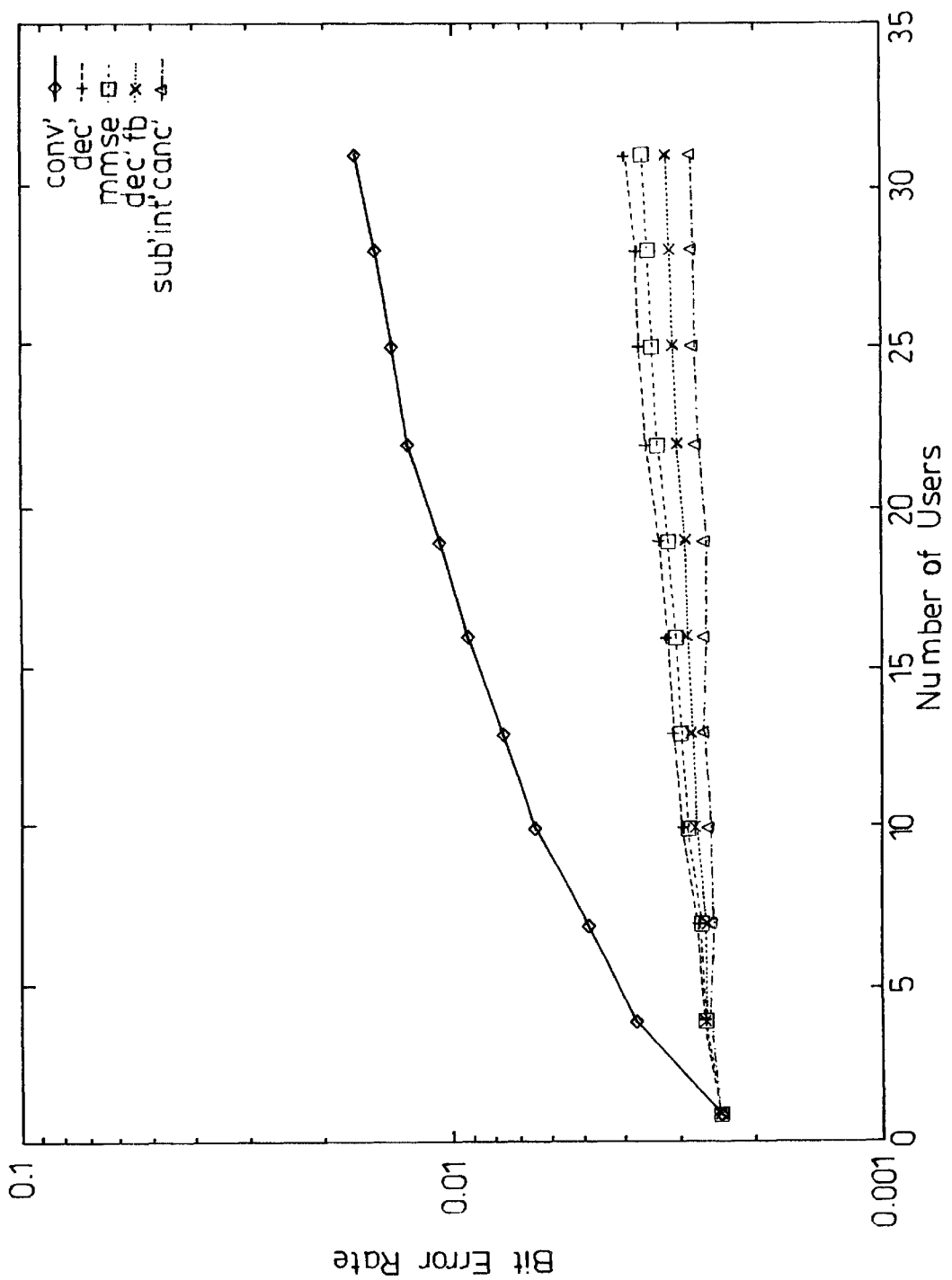
Figure 9C:
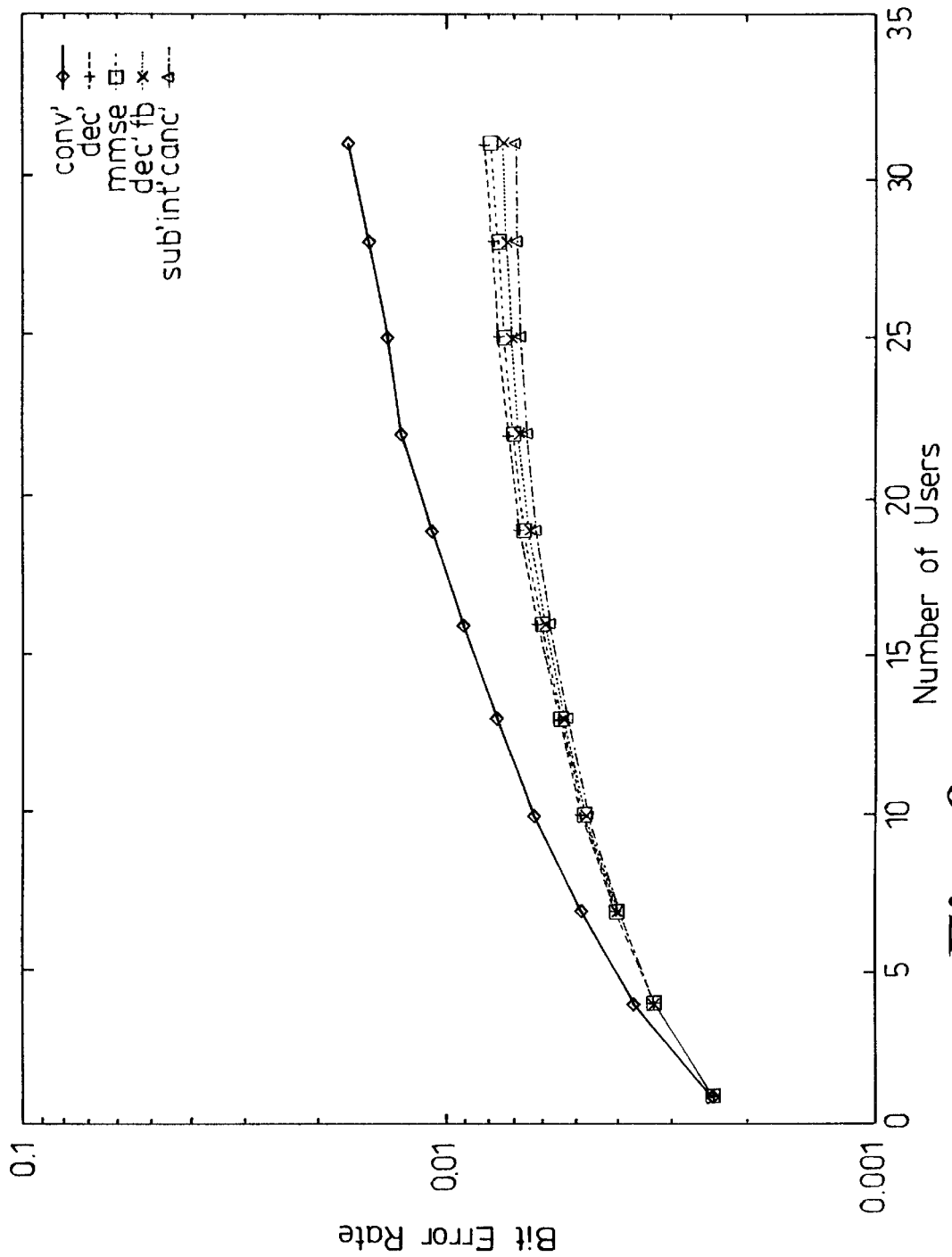
Figure 10A:
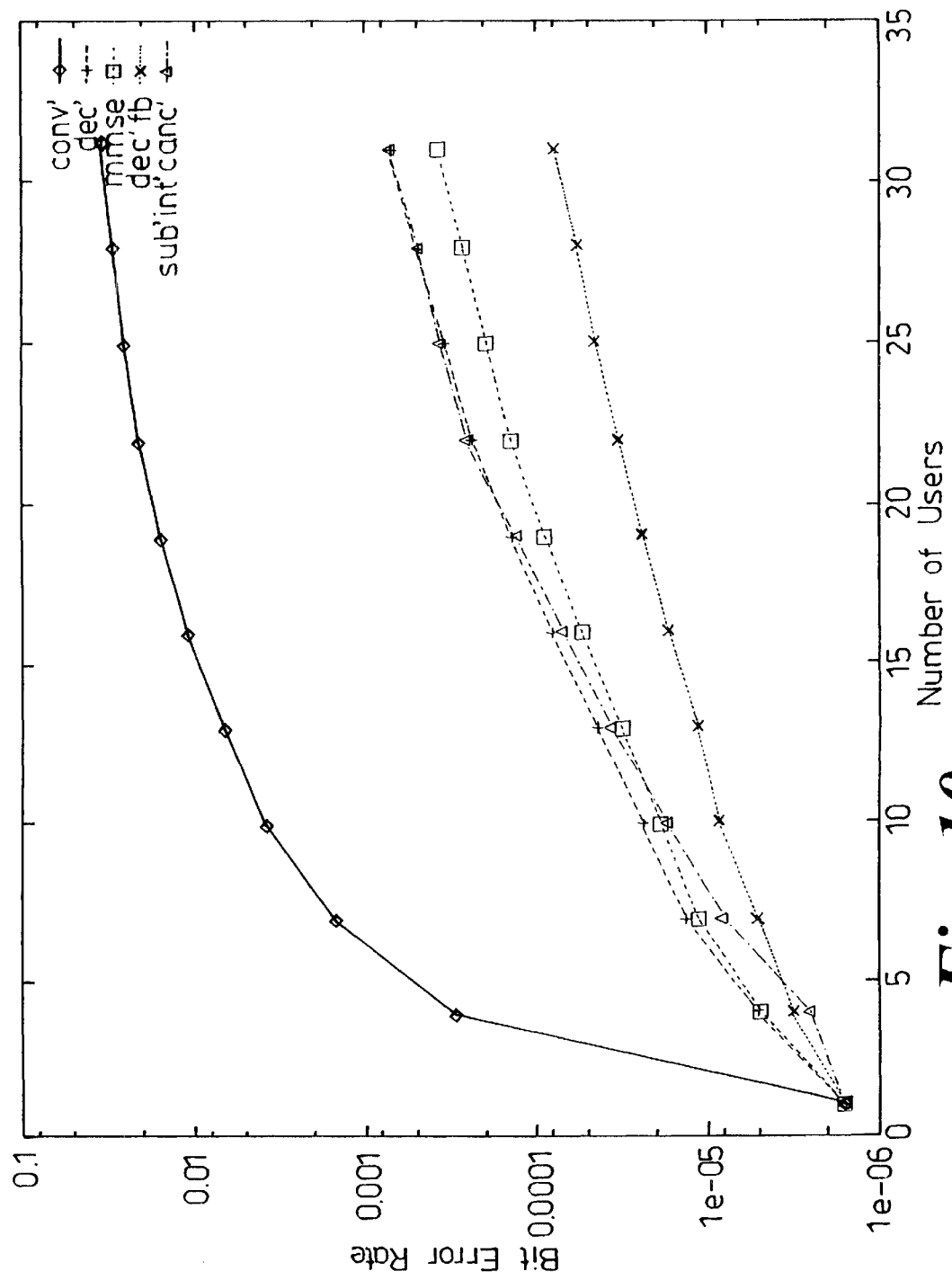
FIGS. 10a, b, c show a graphical comparison of performance in terms of bit error rate versus number of users for various detectors under additive white Gaussian noise propagation conditions at 10 dB SNR.
Figure 10B:
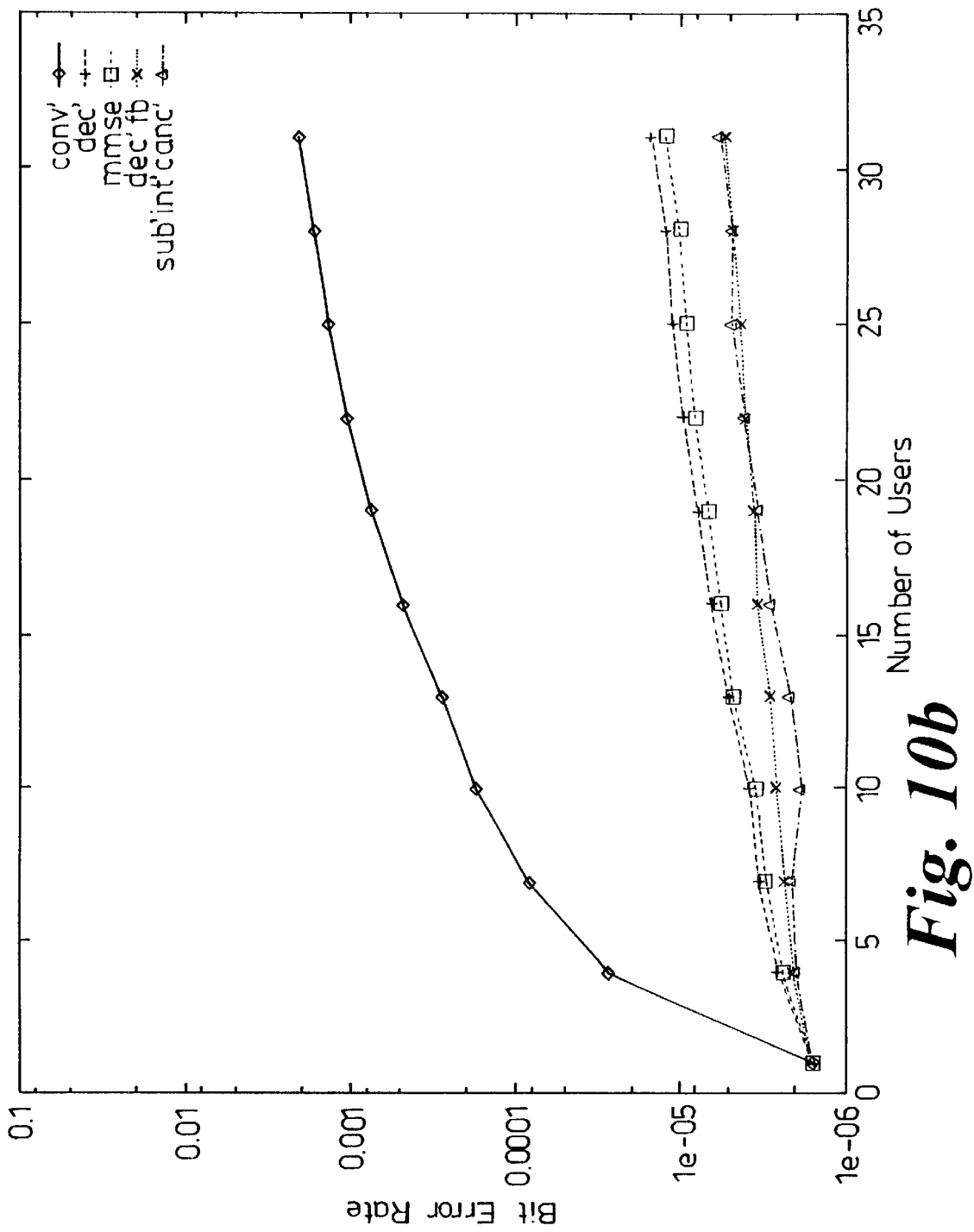
Figure 10C:
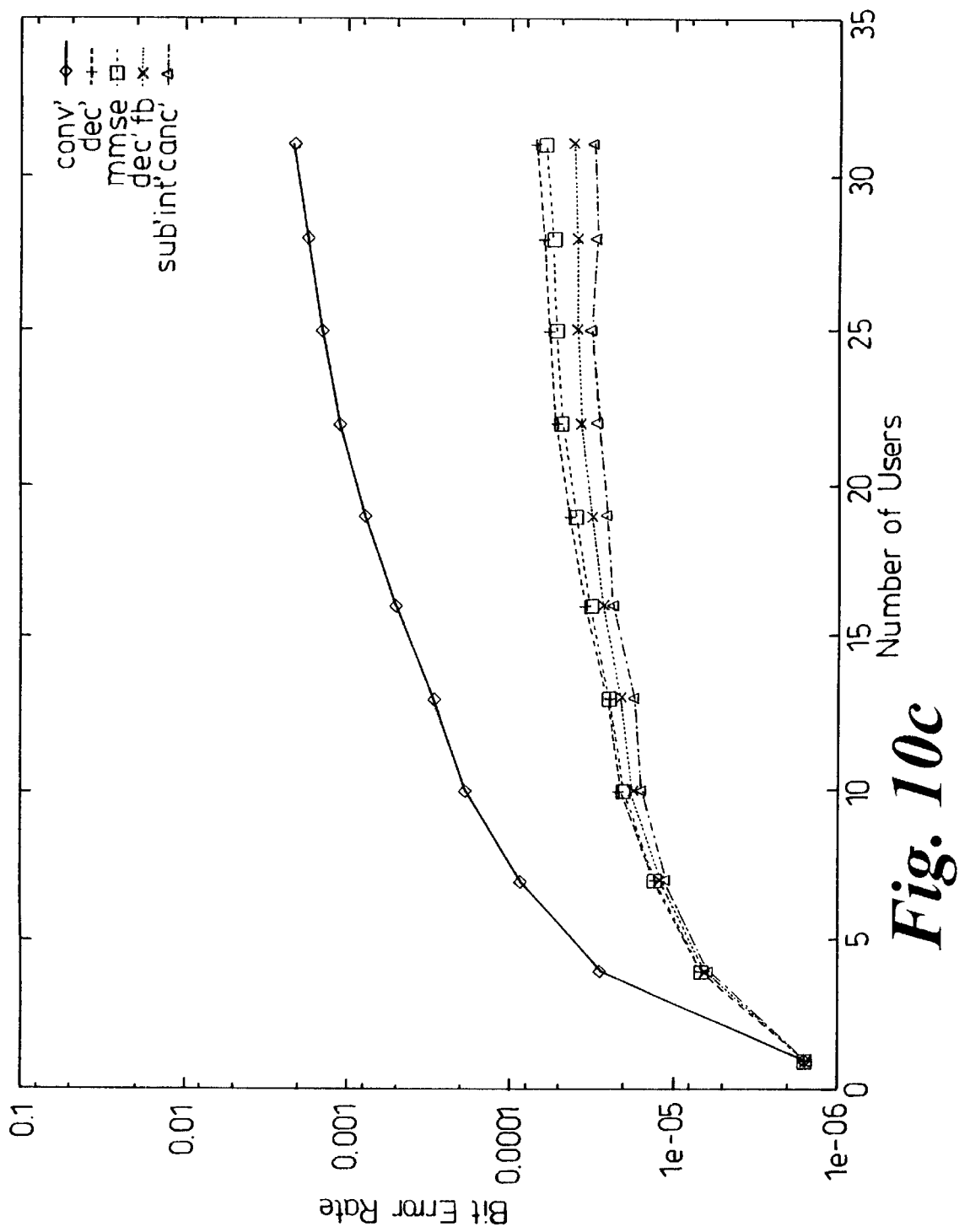
Figure 11A:
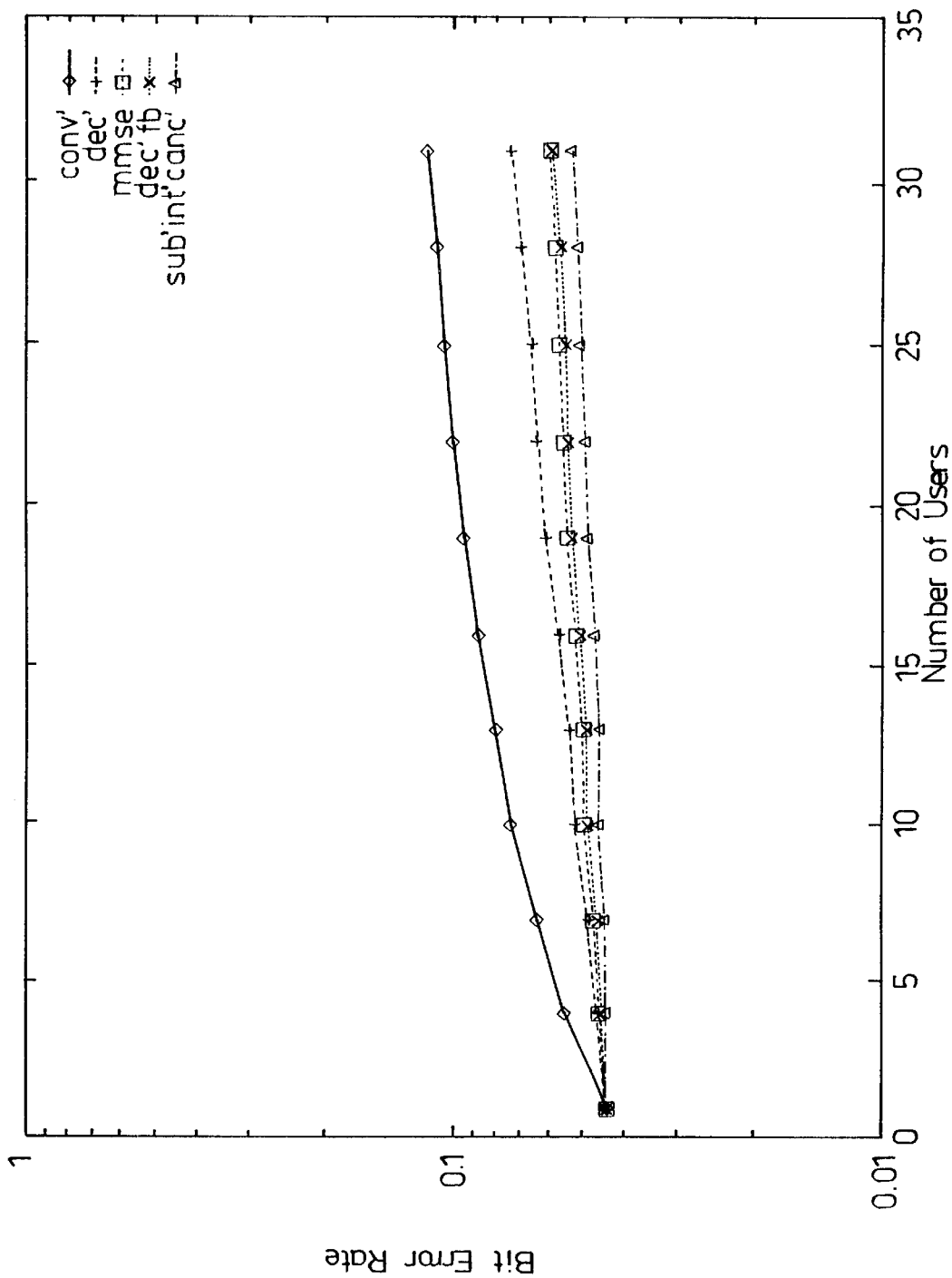
FIGS. 11a, b, c show a graphical comparison of performance in terms of bit error rate versus number of users for various detectors under single path fading propagation conditions at 7 dB SNR.
Figure 11B:
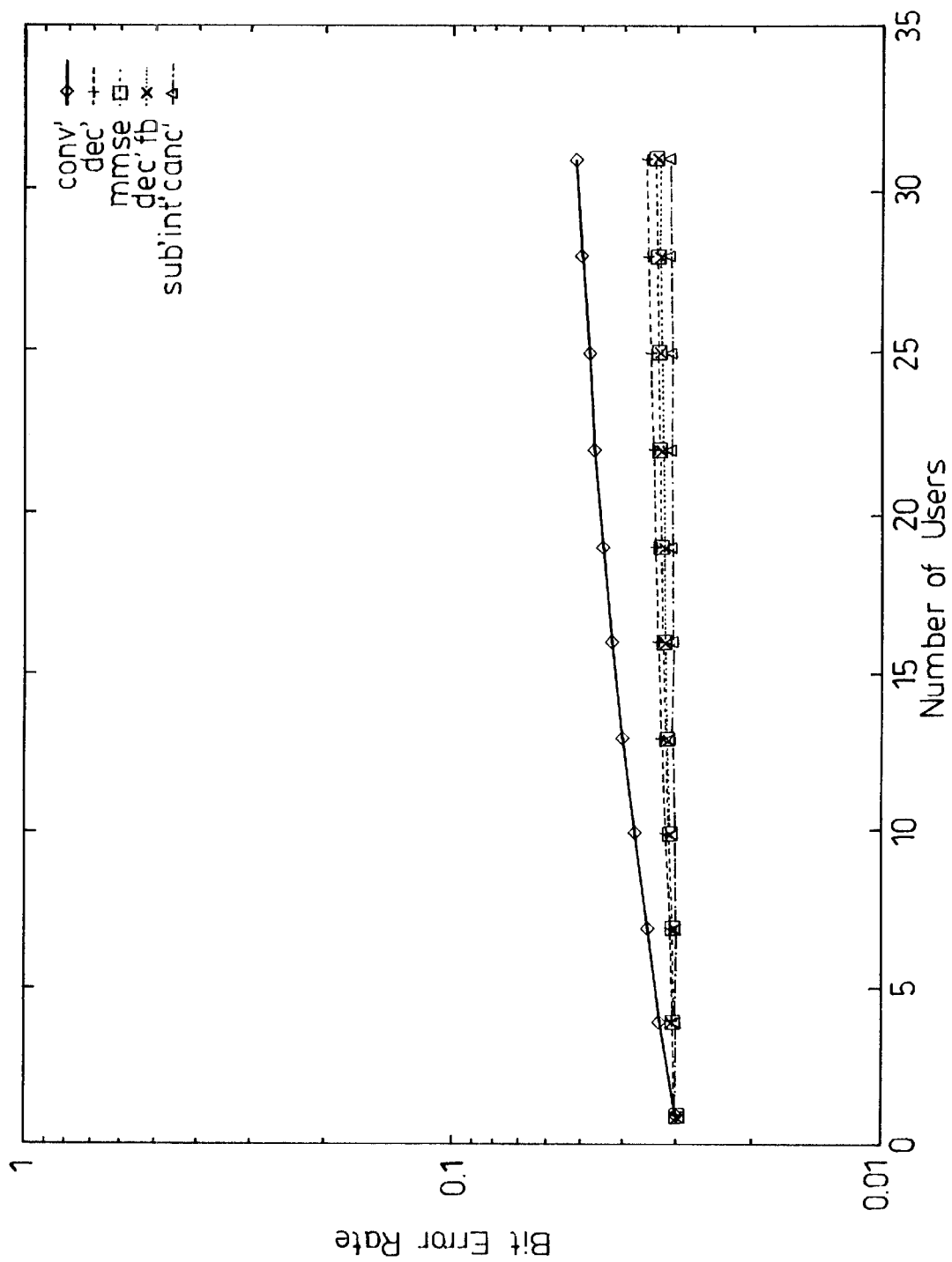
Figure 11C:
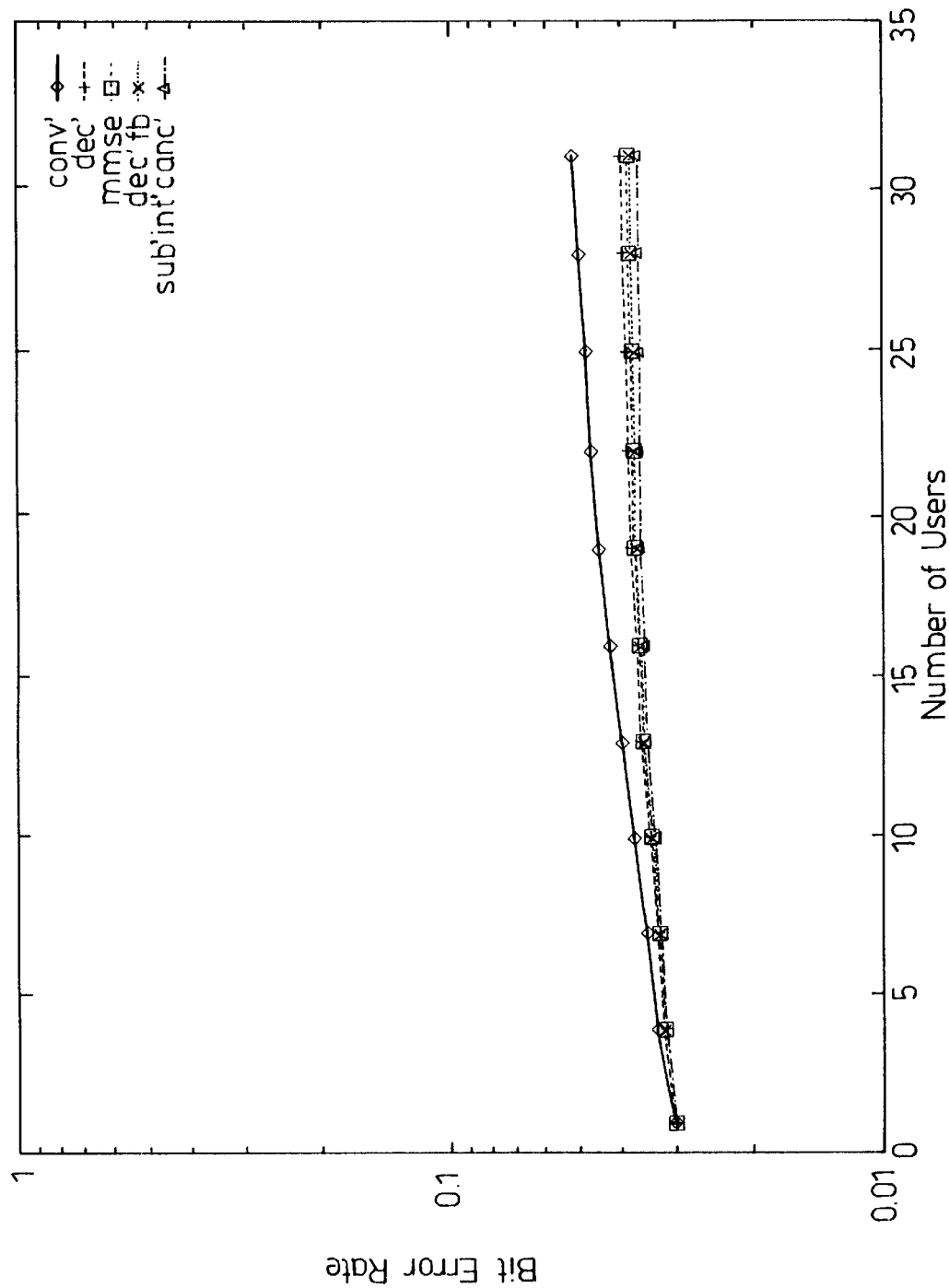
Figure 12A:
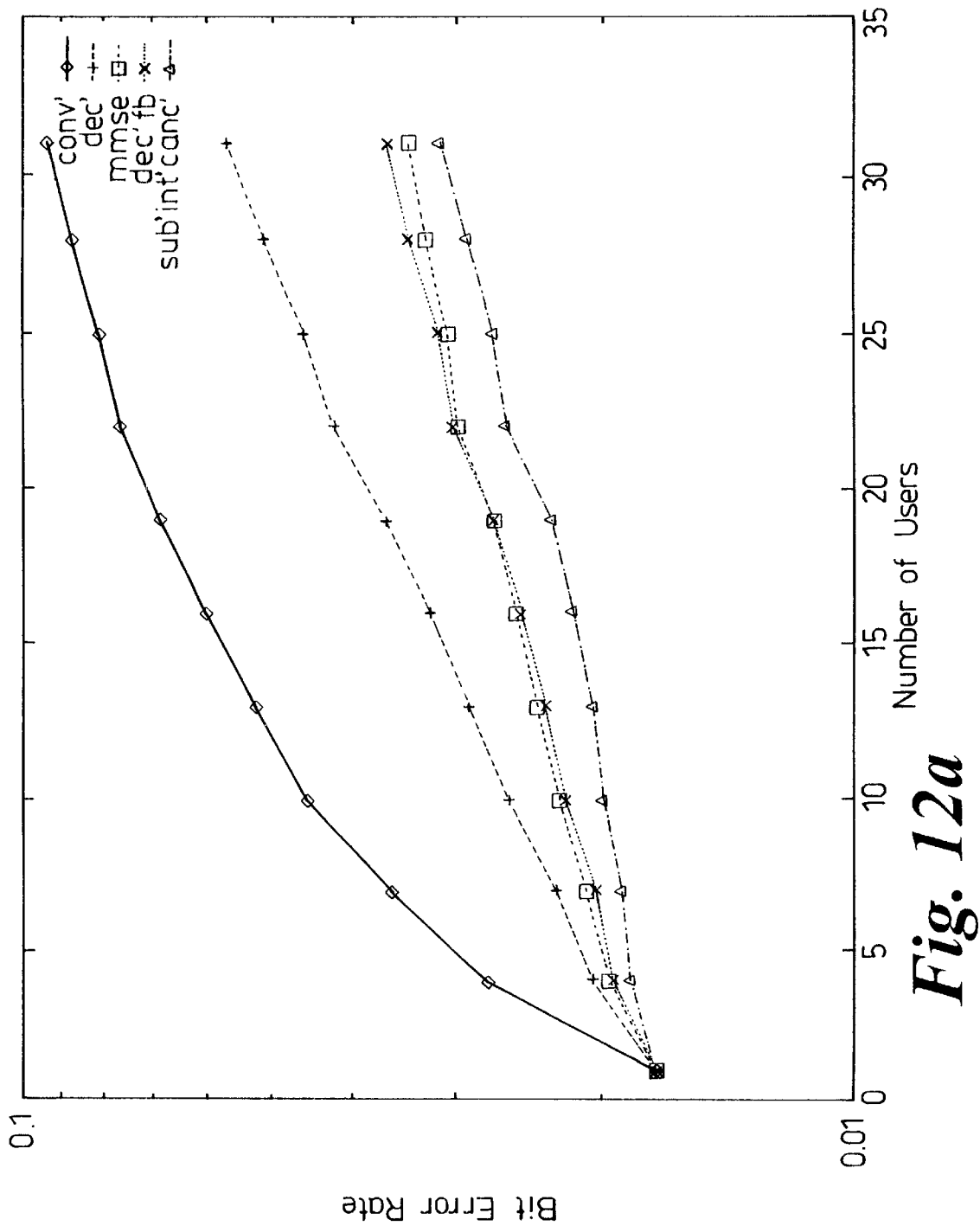
FIGS. 12a, b, c show a graphical comparison of performance in terms of bit error rate versus number of users for various detectors under multipath (J=3) fading propagation conditions at 7 dB SNR.
Figure 12B:
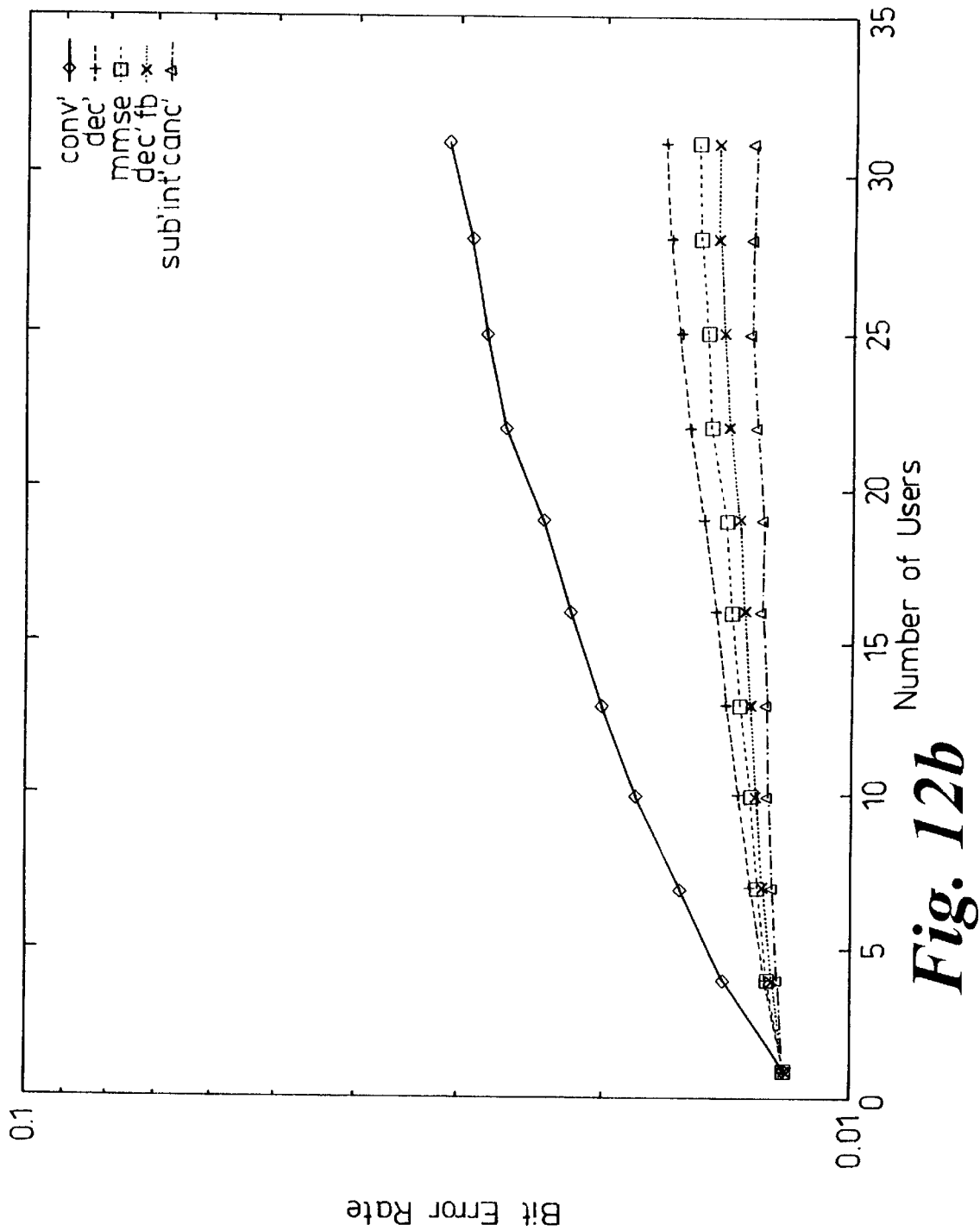
Figure 12C:
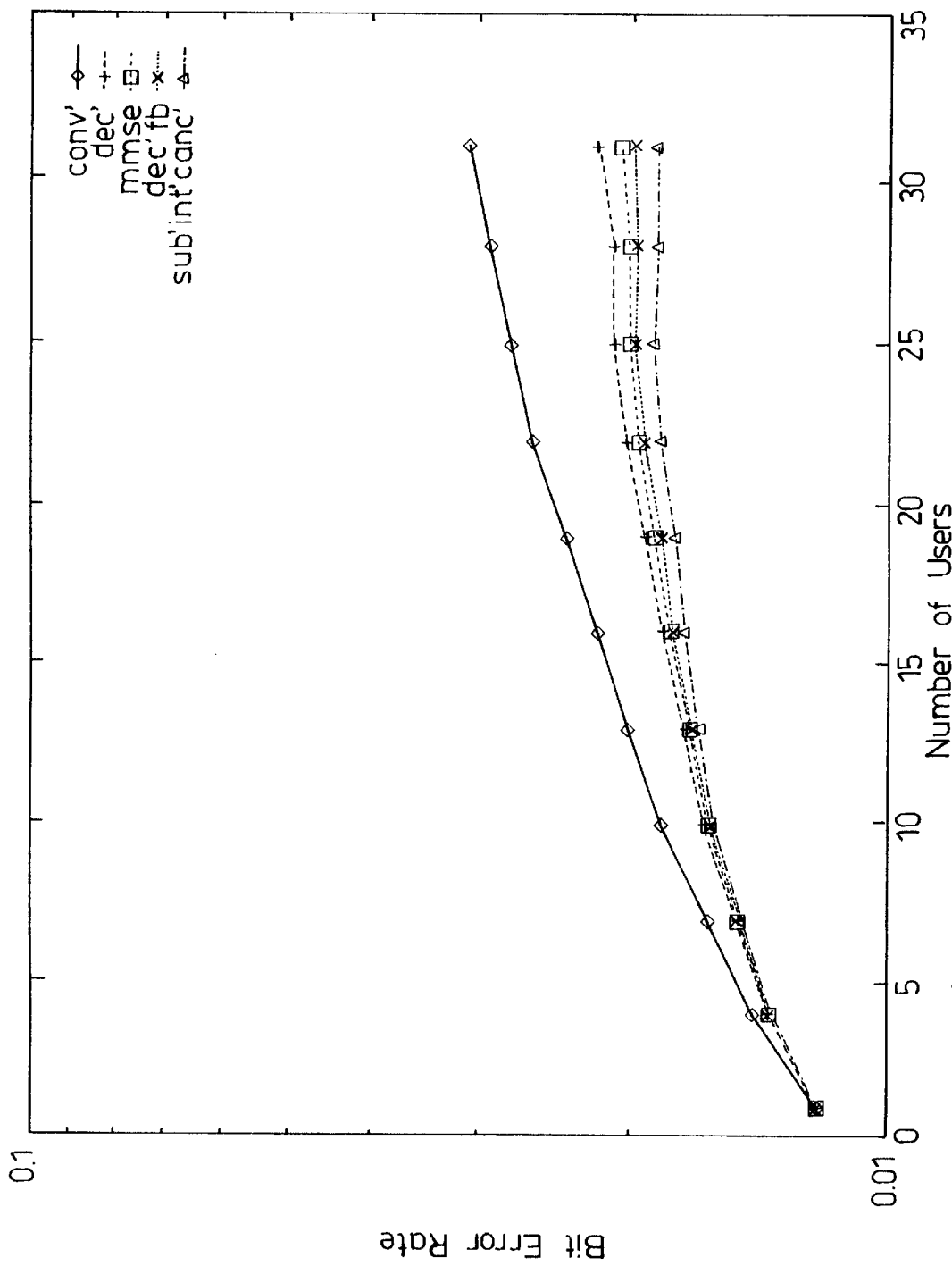
Figure 13A:
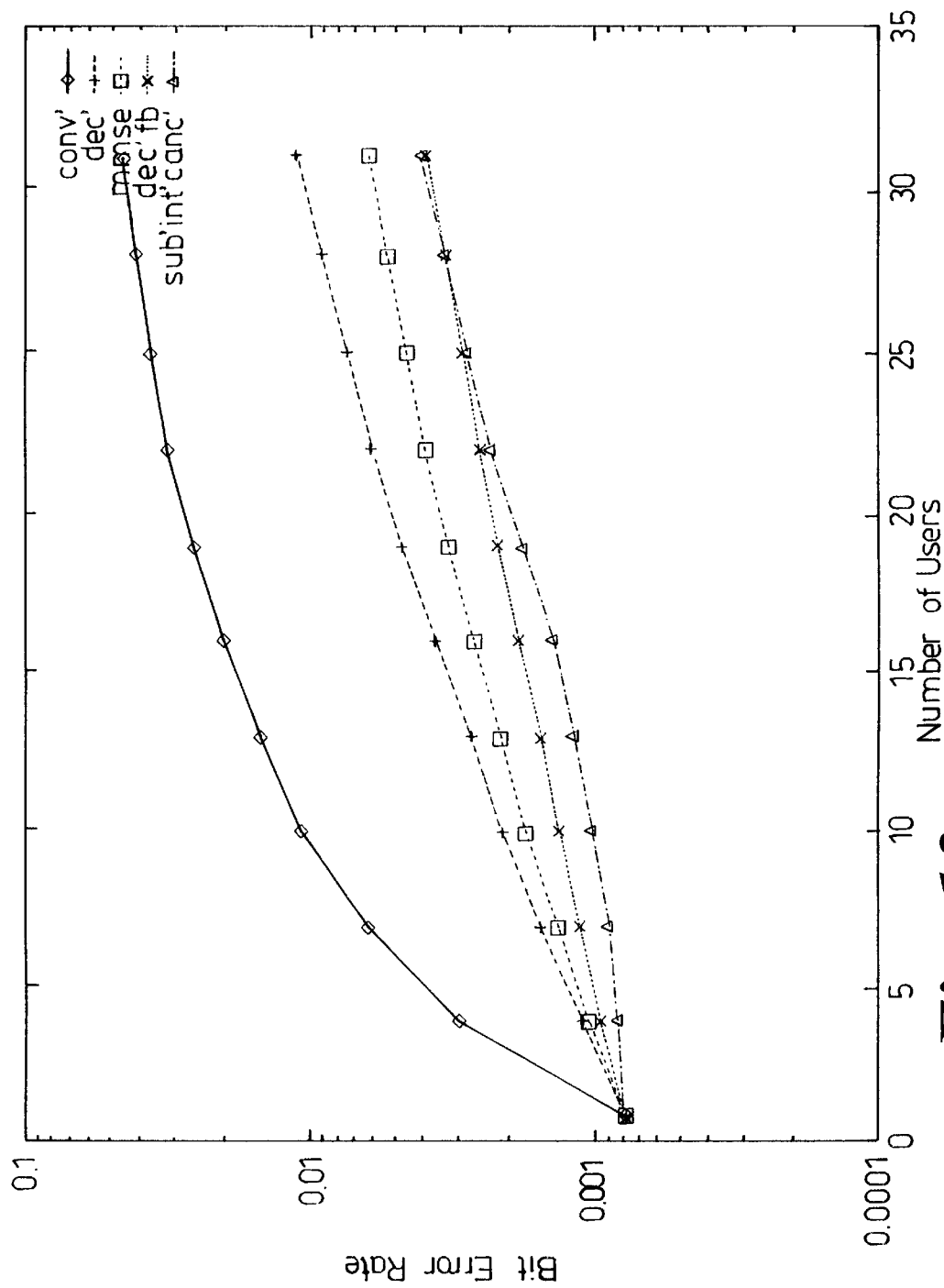
FIGS. 13a, b, c show a graphical comparison of performance in terms of bit error rate versus number of users for various detectors under Additive White Gaussian Noise propagation conditions at 7 dB SNR.
Figure 13B:
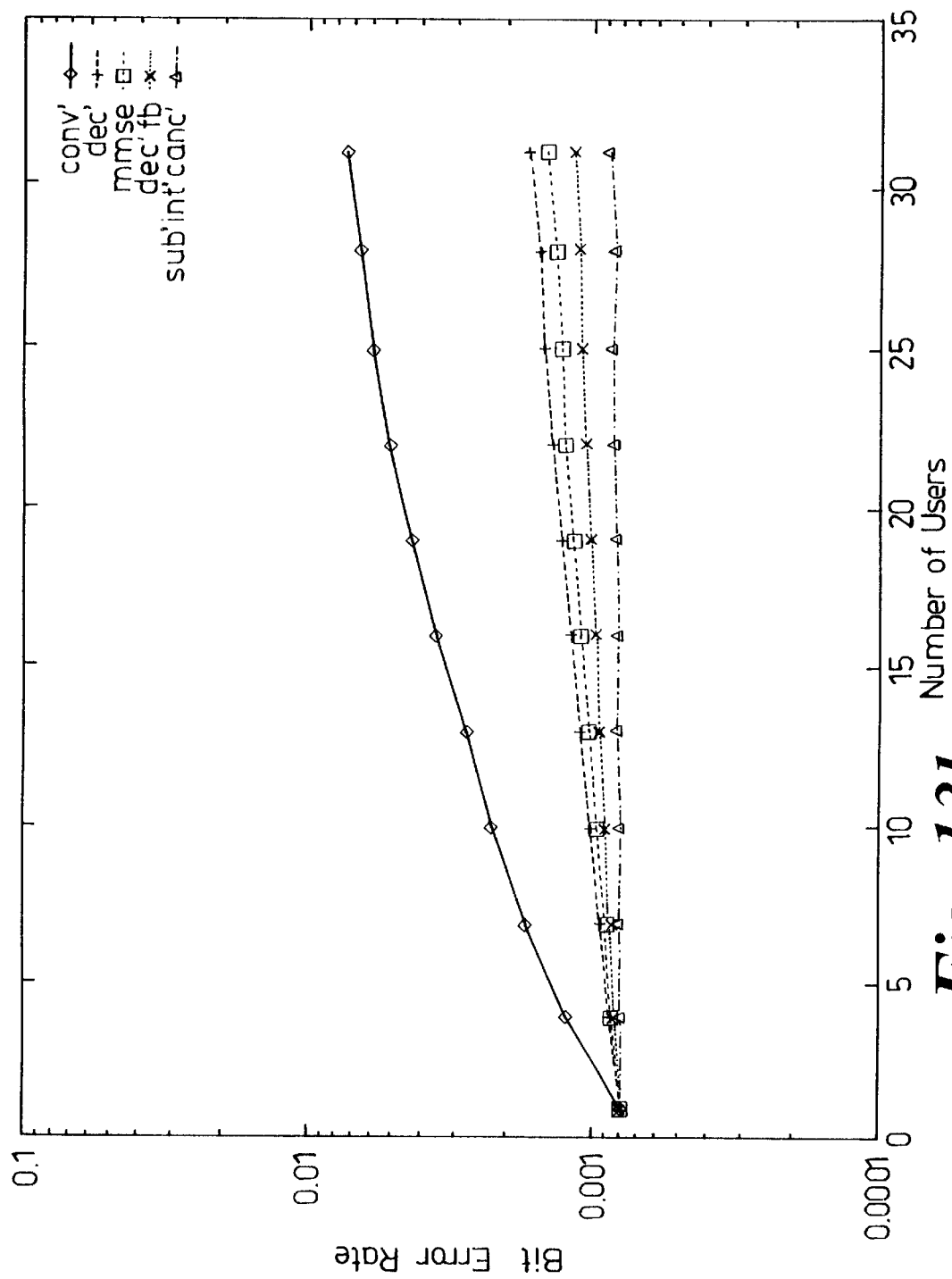
Figure 13C:
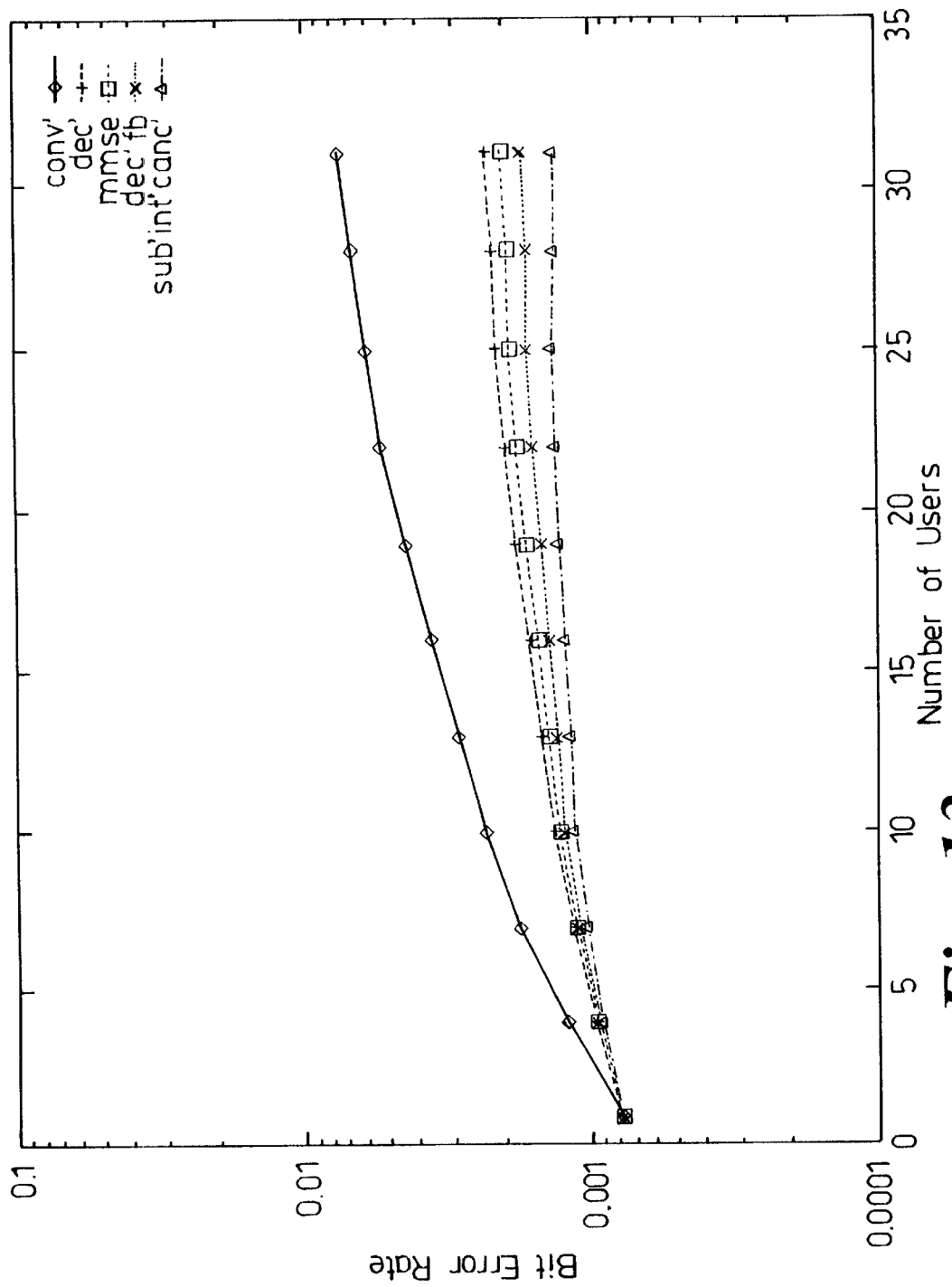
Figure 14A:
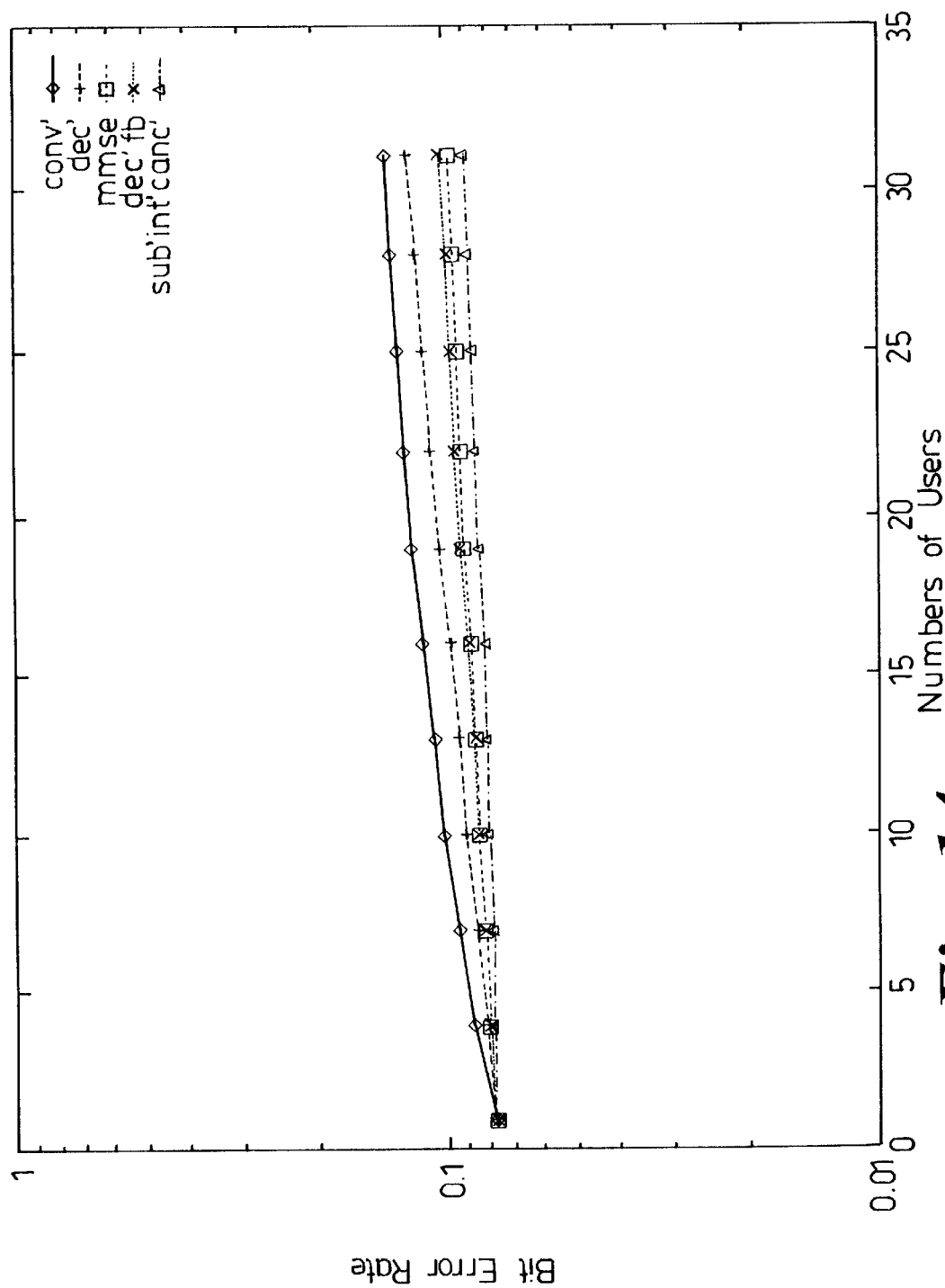
FIGS. 14a, b, c show a graphical comparison of performance in terms of bit error rate versus number of users for various detectors under single path fading propagation conditions at 4 dB SNR; and, FIGS. 15a, b, c show a graphical comparison of performance in terms of bit error rate versus number of users for various detectors under multipath (J=3) fading propagation conditions at 4 dB SNR; and, FIGS. 16a, b, c show a graphical comparison of performance in terms of bit error rate versus number of users for various detectors under Additive White Gaussian Noise propagation conditions at 4 dB SNR.
Figure 14B:
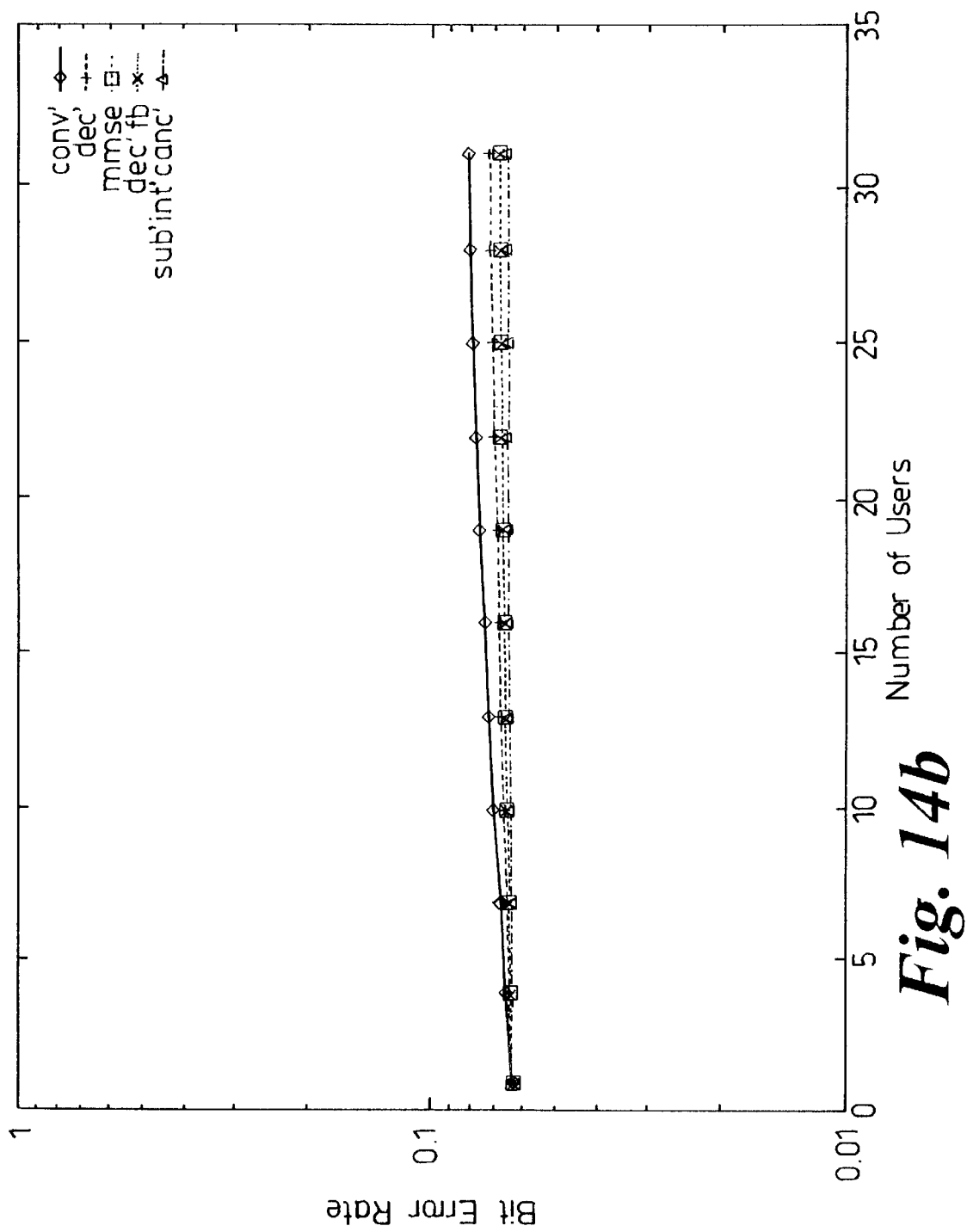
Figure 14C:
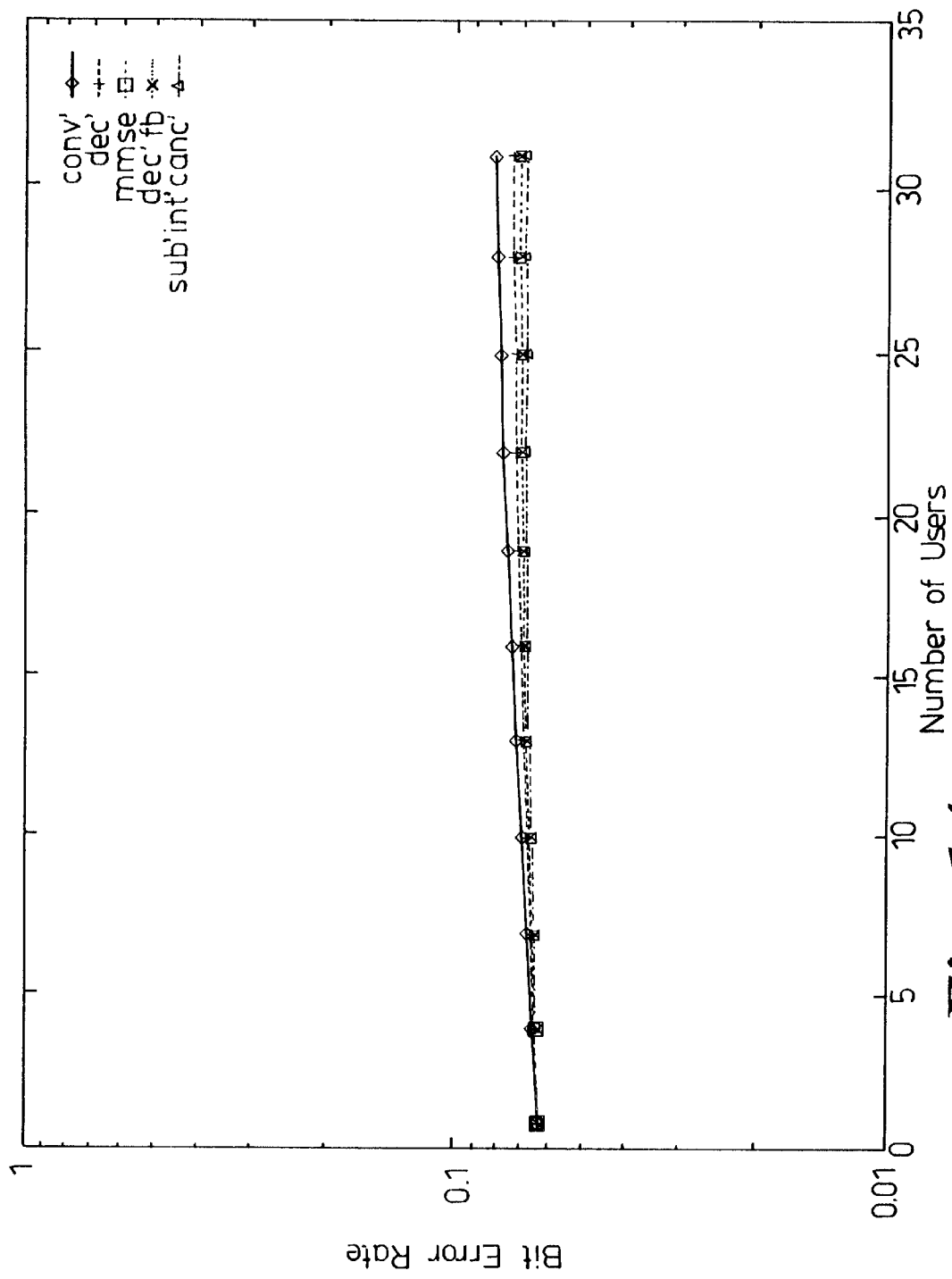
Figure 15A:
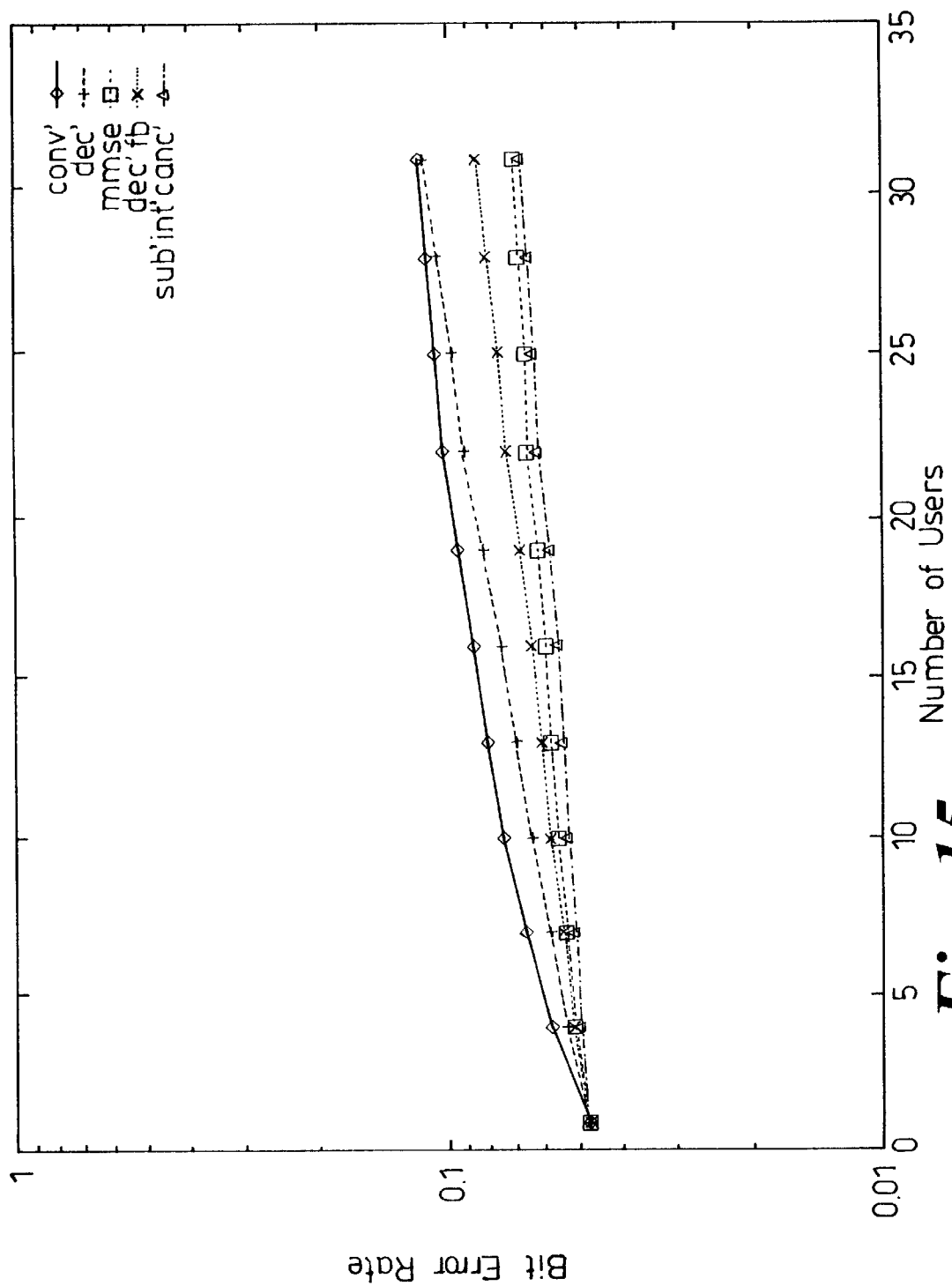
Figure 15B:
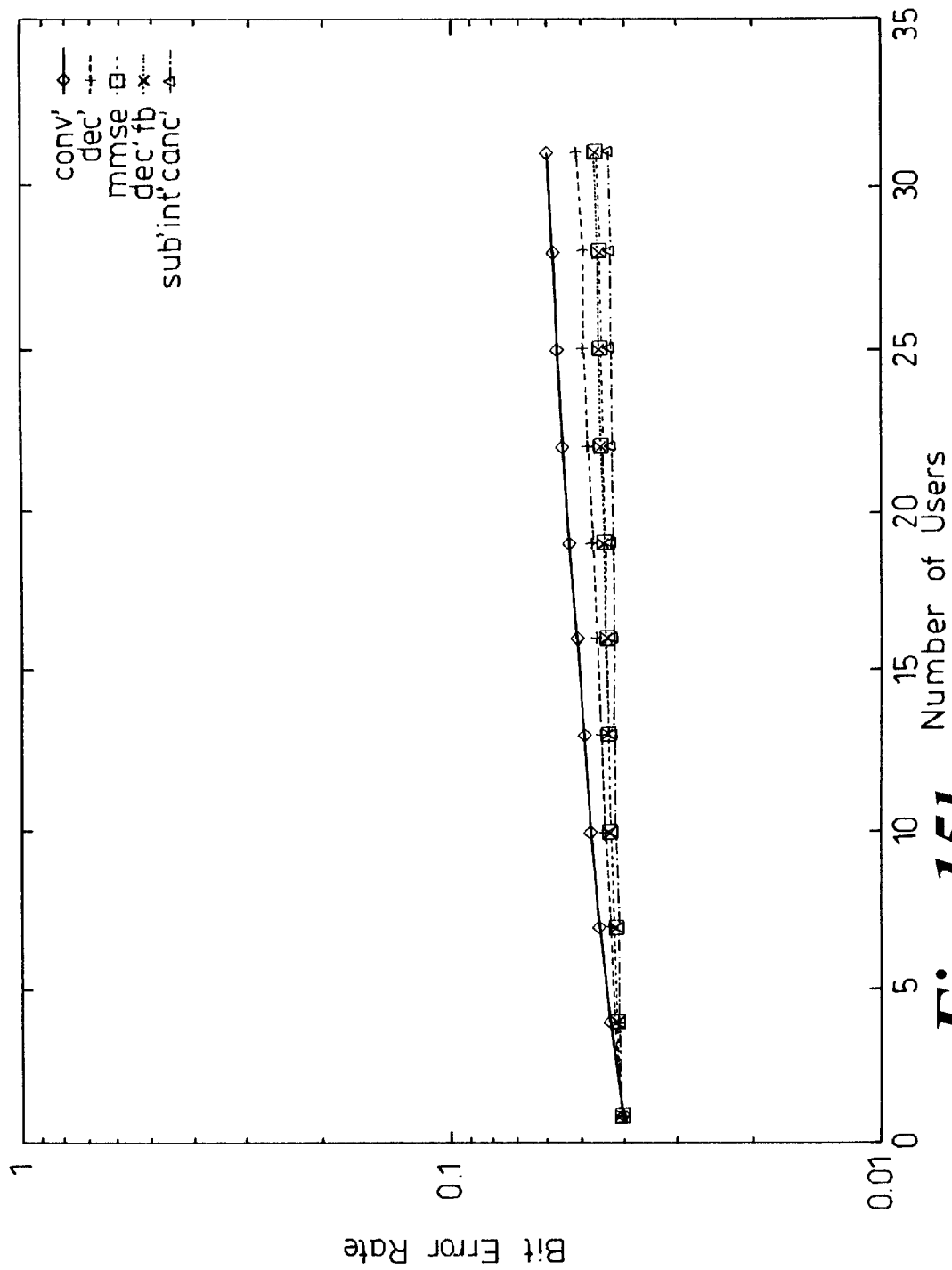
Figure 15C:
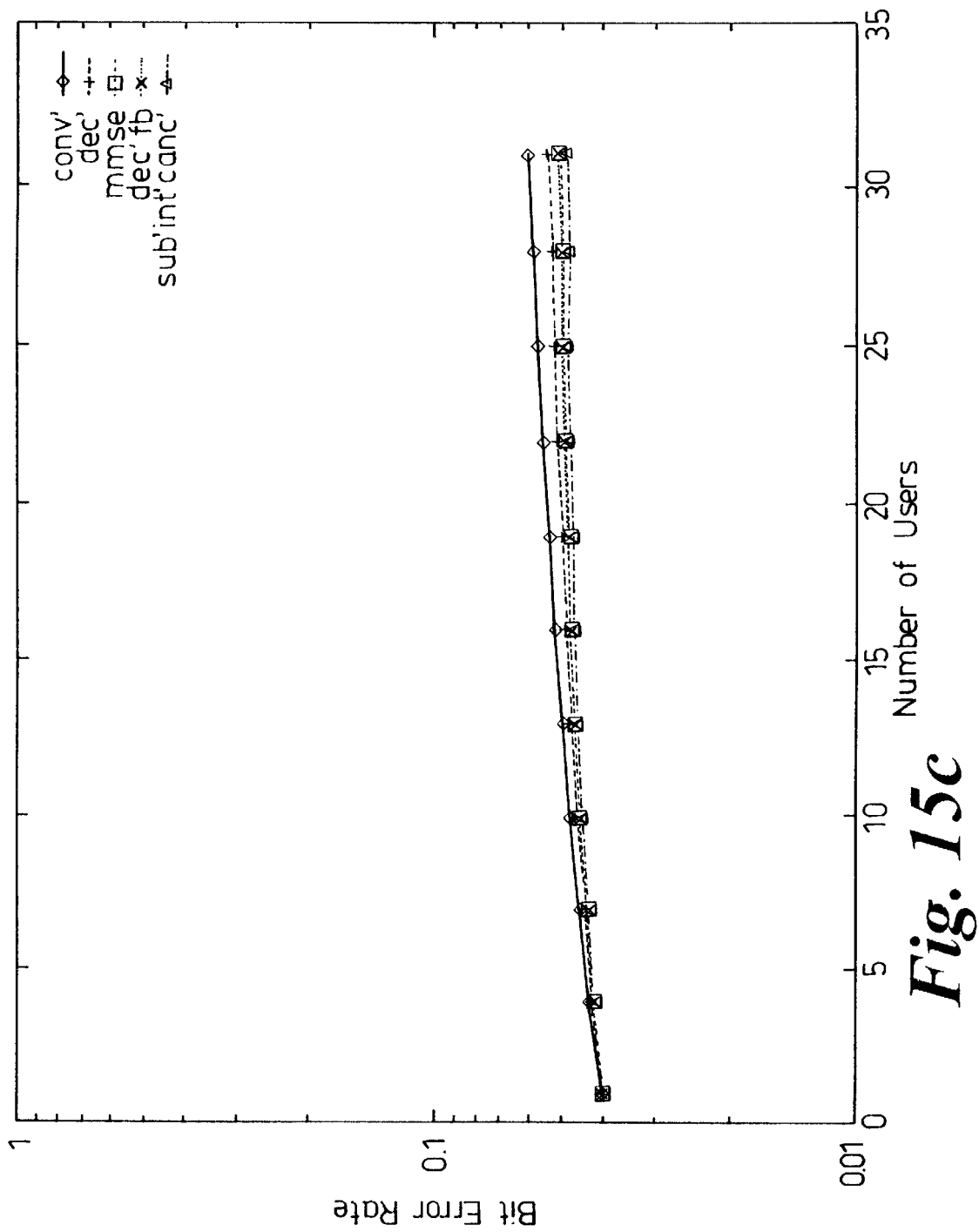
Figure 16A:
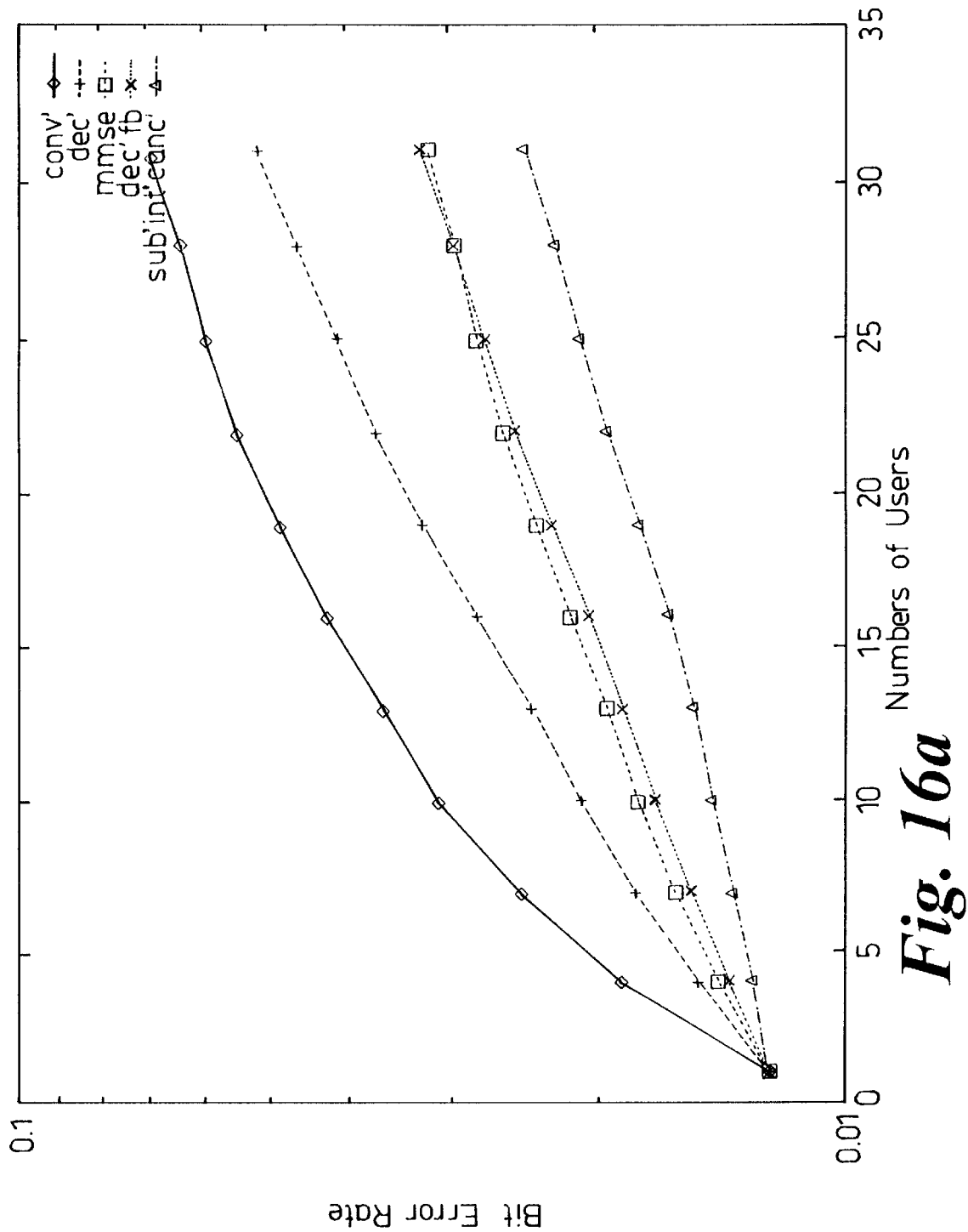
Figure 16B:
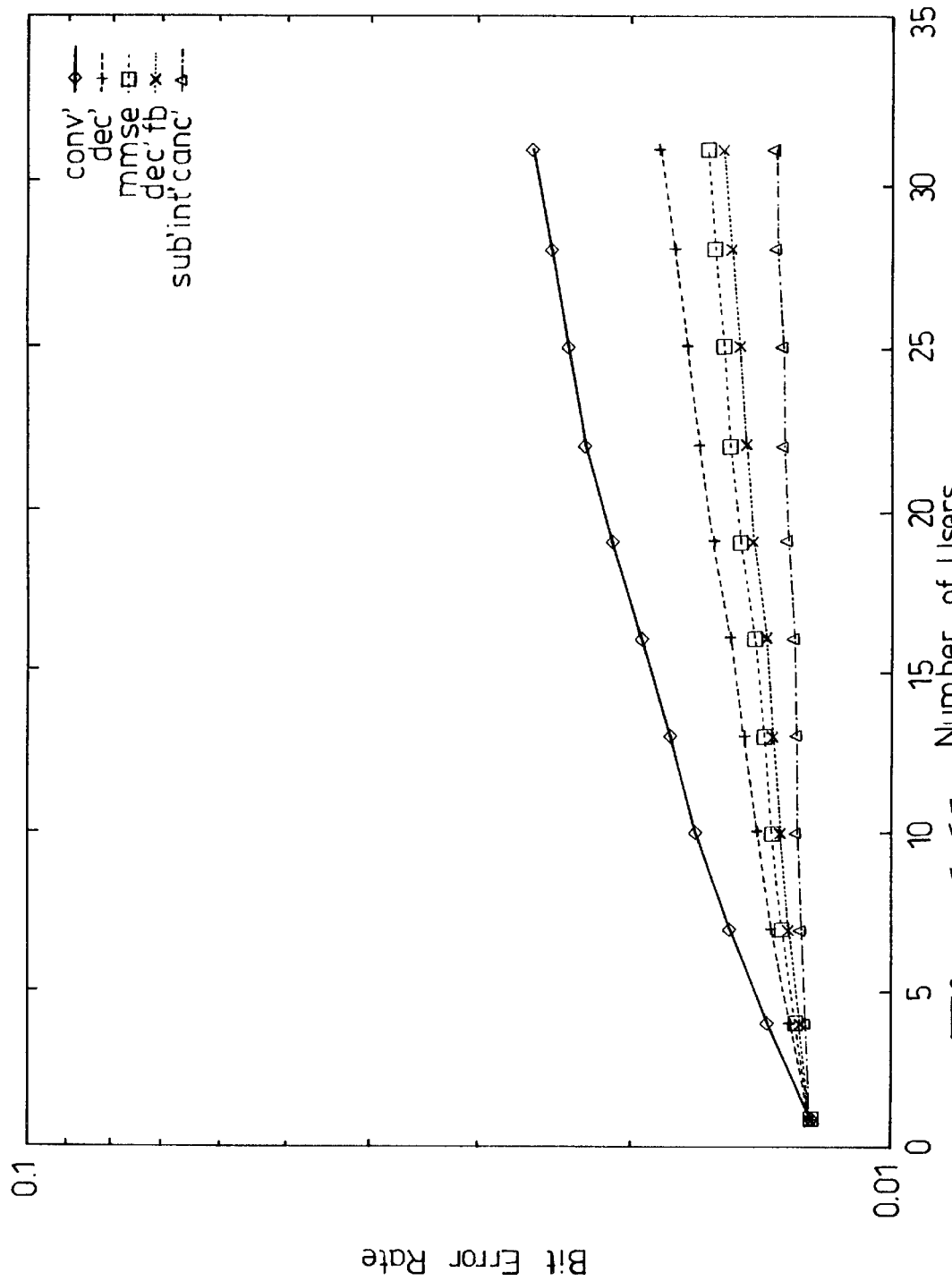
Figure 16C:
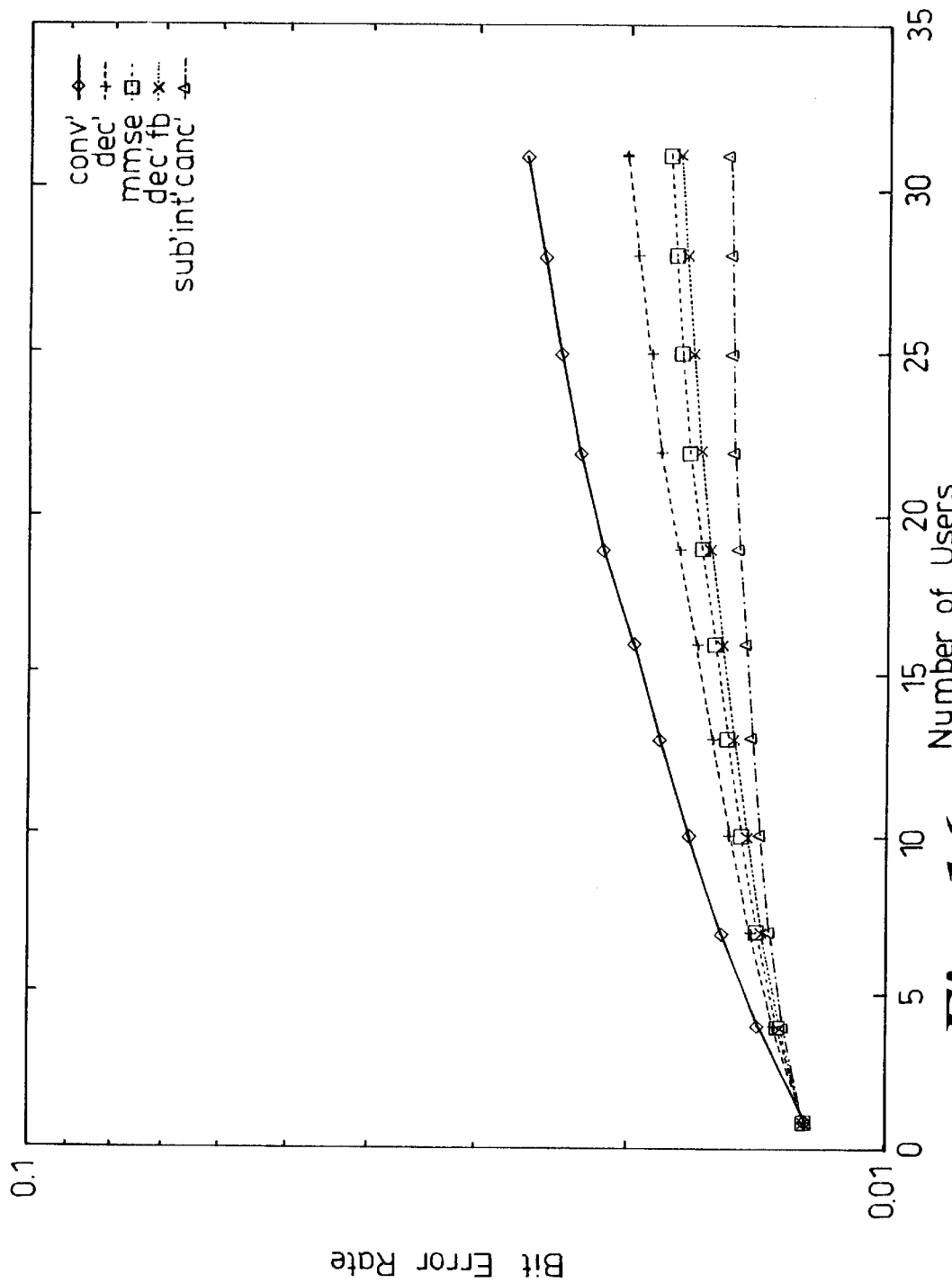

FIG. 7 shows a multi-user detection arrangement where data is separated into classes. The components of the processed received signal w=(S/L)d+n are partitioned into classes according to user equivalence classes. For the e-th user equivalence class, a submatrix $S_e$ of the spatial and temporal correlation matrix S is formed. Multi-user detection techniques based on the approximating equation $w_e = (S_e/L)d_e + n_e$ are then employed to obtain the estimated data.

Each submatrix of S yields a good approximation to the effects of signal fading and of pseudo-noise coding and decoding on the signals transmitted by the users in its corresponding class. Multi-user detection is thereby restricted to these classes, whereby only multiple access terms of little significance are discarded. This results in only a slight degradation in the performance of multi-user detectors.

The step of combining the multipath components is optional: estimates of d, Ad or DATd can be made, using w or y. If y is used, multi-user detection based upon appropriate submatrices of R/L would be applied to the classes. If the equivalence classes are selected appropriately, for each class the appropriate submatrix of R/L would yield a good approximation to the temporal and spatial cross-correlations between the signals transmitted by the users in the class, up to fading effects.

Simulations were carried out in order to compare the bit error rates achieved by three approaches to bit detection. The first approach employed a single antenna and standard bit detection techniques; the second approach employed beamforming by means of a uniform linear array of M antennas, M>1, followed by the application of standard bit detection techniques; and the third approach employed beamforming as for the second approach, partitioning the users into equivalence classes based on their spatial signatures, followed by the application of standard bit detection techniques, restricted to the classes.

The simulations were based upon a scenario of up to 33 users per cell, with an array of four antennas for the beamforming and Gold codes of length 31 were used. The number of bits per user considered at one time was set at four (N=4) and the beamforming threshold for third approach was set at θ=0.7. Noise samples at the antenna outputs were assumed to be Gaussian, and signal to noise ratios of 4, 7 and 10 dB were selected. Five methods of bit detection were simulated. The simulations were based on three channel types: 1) additive white Gaussian noise (AWGN) channels; 2) single path (J=1) Rayleigh fading channels, and; 3) multipath (J=3) Rayleigh fading channels. Graphical representations of these measurements are displayed as bit error rates versus number of users in FIGS. 8–16.

To model the AWGN channels, single path transmission was assumed. The time delays (measured in chips) were uniformly distributed over [0,31]. The channel amplitudes and attenuations were all set to one and the phase shifts uniformly distributed over [0, 2π]. The bearings of the users were uniformly distributed over [−π/3, π/3].

To model the Rayleigh fading channels the time delays of first multipath components were uniformly distributed over [0,31]. The central bearings of first multipath components were uniformly distributed over $[-\pi/3, \pi/3]$. For each user, central bearings of other multipath components were uniformly distributed about the first with a spread of one radian. It was assumed that each channel tap arrives from its central bearing with uniform angular power density over a spread of 0.33 radians. For the single path Rayleigh fading channels the average received power per user was set to one. For multipath transmission; for each user, relative path delays were set to one chip; and average received powers per user to 1, 0.5, and 0.25.

FIGS. 8a–16a (depicting the first approach) confirm that multi-user detection yields lower bit error rates than conventional detection and hence increases capacity. This increase in capacity becomes more significant as the signal-to-noise ratio increases or as fading effects decrease.

For the first approach, in general, subtractive interference cancellation yields the lowest bit error rates. For very high numbers of users, the decision feedback decorrelator may perform best. Subtractive interference cancellation provides almost single-user performance in the presence of severe fading.

Reducing multiple access interference by beamforming enables all detectors to achieve lower bit error rates and hence increases capacity (the second approach, see FIGS. 8b–16b). Significant capacity gains can be achieved by using beamforming followed by multi-user detection if fading is not too severe and signal-to-noise ratios are high enough.

The bit error rates achieved by multi-user detectors become closer as multiple access interference is reduced. Subtractive interference cancellation provides the lowest bit error rates, giving almost single-user performance.

Beamforming followed by multi-user detection applied to spatial equivalence classes (the third approach, see FIGS. 8c–16c) yields slightly higher bit error rates than beamforming followed by multi-user detection applied to all users at once. As the signal-to-noise ratio decreases or as fading effects increase, the difference in bit error rate given by the two approaches becomes less significant. This approach is potentially much less computationally complex than the second approach.

For the third approach, subtractive interference cancellation provides the lowest bit error rates and tends towards single-user performance as signal-to-noise ratio decreases or as fading effects increase.

It has been shown, for the reverse link of a cellular direct sequence code division multiple access system, that by using multi-user detection [Moshavi96] or antenna array receivers [Naguib94], bit error rates considerably lower than those provided by the conventional detector can be achieved. The results depicted in FIGS. 8a, b–16a, b (first and second approaches) confirm these findings for both single path AWGN channels and Rayleigh fading single and multipath channels and show that initial beamforming followed by multi-user detection further decreases bit error rate and hence increases capacity, but at a cost in complexity. The results depicted in FIGS. 8c–16c (the third approach) indicate that initial beamforming followed by multi-user detection applied to spatial equivalence classes is worthy of consideration.

In general, the conventional detector gives the highest bit error rates and subtractive interference cancellation gives the lowest bit error rates. The decision feedback detector may perform best for large numbers of users if beamforming is not used. The MMSE and decision feedback detectors perform better than the decorrelator.

Significant capacity gains can be achieved by using beamforming followed by multi-user detection if fading is not too severe and signal-to-noise ratios are high enough. The second approach gives the highest capacity, but is the most costly to implement. If the number of antennas at the receiver is increased, beamforming techniques can be refined and the sizes of the equivalence classes can be reduced. By restricting to equivalence classes, the computational burden can be reduced. By choosing the beamforming threshold wisely, only multiple access interference terms of little significance are discarded and hence only a slight degradation in the performance of multi-user detectors is observed.

When restricting to equivalence classes, subtractive interference cancellation generally provides the best bit error rates. It is more computationally costly than conventional detection; but much less costly than using the decorrelator, the MMSE detector implemented in this study or the decision feedback decorrelator, all of which are based on matrix inversion. However, like the matrix inversion implementation of the MMSE detector and the decision feedback decorrelator, it requires a good deal of information, namely, the timing and codes of all the users, and the relative amplitudes of the incoming signals.

The computational complexity incurred by beamforming depends upon the algorithm selected for determining the spatial filters [Thompson96] (J. S Thompson, P. M. Grant and B. Mulgrew, "Performance of Antenna Array Receivers for CDMA", Proc. IEEE Globecom Conf, London (UK), November 1996, pp570–4.). Different algorithms vary in their complexities. However, multi-user detection applied to spatial equivalence classes is potentially far less complex than multi-user detection applied to all users at once. Hence, if fading is not too severe and signal-to-noise ratios are high enough, the present invention can provide, using one of the simpler forms of multi-user detection, the best compromise between performance and computational cost.

What is claimed is:

1. A multi-user detection radio communications system wherein an equivalence relation is defined for a set of users based on a set of beam-forming terms to group the users according to their spatial signatures.

2. A system according to claim 1 wherein the beam-forming terms are $a^H(\theta_i)a(\theta_j)$.

3. A system in accordance with claim 1 wherein the beam-forming terms are $a^H(\theta_i)a(\theta_j)$ and wherein the user classes are determined so that, if user i and user j are not in equivalent classes, the absolute value of $a^H(\theta_i)a(\theta_j)$ is small in some sense.

4. A system in accordance with claim 1 wherein the beam-forming terms are $a^H(\theta_i)a(\theta_j)$ and wherein the absolute value of $a^H(\theta_i)a(\theta_j)$ is then replaced by zero, which allows the multiple access interference to be ignored between equivalence classes.

5. A system in accordance with claim 1 wherein the beam-forming terms are $a^H(\theta_i)a(\theta_j)$ and wherein the users are sorted into equivalence classes based on the beam patterns, where the beam pattern has a threshold $\Theta$ which lies in the following range: $0 \leq \Theta \leq 1$; in accordance with the following relations:

a first relation '≈' between users, which is symmetric, reflexive and non-transitive, and is defined by:

user $i \approx$ user $j$ if $\|a^H(\theta_i)a(\theta_j)\|^2 \geq \Theta$; and a second relation '~' between users, which is symmetric, reflexive and transitive, and is defined by:

user $i \sim$ user $j$, provided that there exists a finite sequence of users with indices $i_o, i_1, \ldots, i_Q$ such that:

$$\text{user } i \approx \text{user } i_o \approx \text{user } i_1 \approx \ldots \approx \text{user } i_Q \approx \text{user } j.$$

6. A system according to claim 1, wherein the modulation scheme is a code division multiple access scheme.

7. A system according to claim 1, wherein the beam-forming terms are $(x^H_{p,o}/\|x_{p,o}\|)(x_{i,o}/\|x_{i,o}\|)$.

8. A system in accordance with claim 1, wherein the beam-forming terms are $(x^H_{p,o}/\|x_{p,o}\|)(x_{i,o}/\|x_{i,o}\|)$ and wherein the user classes are determined so that, if user p and user i are not in equivalent classes, the absolute value of $(x^H_{p,o}/\|x_{p,o}\|)(x_{i,o}/\|x_{i,o}\|)$ is small in some sense.

9. A system in accordance with claim 1, wherein the beam-forming terms are $(x^H_{p,o}/\|x_{p,o}\|)(x_{i,o}/\|x_{i,o}\|)$ and wherein equivalence classes can be determined in this situation if it can be assumed that if the quantity $(x^H_{p,o}/\|x_{p,o}\|)(x_{i,o}/\|x_{i,o}\|)$ is small, the quantities $(x^H_{p,j}/\|x_{p,j}\|)(x_{i,j'}/\|x_{i,j'}\|)$, where $0 \leq j, j' \leq J$, are also small. This permits all the multiple access interference between two users in different equivalence classes to be ignored.

10. A system in accordance with claim 1, wherein the beam-forming terms are $(x^H_{p,o}/\|x_{p,o}\|)(x_{i,o}/\|x_{i,o}\|)$ and wherein user p and user i are sorted into equivalence classes based on the beam patterns according to a beam pattern threshold, $\Theta$, which lies in the following range: $0 \leq \Theta \leq 1$; and, wherein user p and user i are close in bearing if:

$$\|(x^H_{p,o}/\|x_{p,o}\|)(x_{i,o}/\|x_{i,o}\|)\|^2 \geq \Theta.$$

11. A system in accordance with claim 1, wherein the beam-forming terms are $(x^H_{p,o}/\|x_{p,o}\|)(x_{i,o}/\|x_{i,o}\|)$ and wherein the users are sorted into equivalence classes based on the beam patterns, where the beam pattern has a threshold $\Theta$ which lies in the following range: $0 \leq \Theta \leq 1$; in accordance with the following relations:

a first relation '$\approx$' between users is defined by:

$$\text{user } p \approx \text{user } i \text{ if } \|(x^H_{p,o}/\|x_{p,o}\|)(x_{i,o}/\|x_{i,o}\|)\|^2 \geq \Theta; \text{ and}$$

a second relation '~' between users is defined such that: user p~user i if there is a finite sequence of users with indices $p_o, p_1, \ldots, p_Q$, whereby:

$$\text{user } p \approx \text{user } p_0 \approx \text{user } p_1 \approx \ldots \approx \text{user } p_Q \approx \text{user } i.$$

12. A method of operating a multi-user detection radio communications system wherein an equivalence relation is defined for a set of users based on a set of beam-forming terms wherein the users are grouped according to their spatial signatures.

13. A method according to claim 12 wherein the beam-forming terms are $a^H(\theta_i)a(\theta_j)$.

14. A method according to claim 12, wherein the beam-forming terms are $(x^H_{p,o}/\|x_{p,o}\|)(x_{i,o}/\|x_{i,o}\|)$.

15. A method according to claim 12, wherein the modulation scheme is a code division multiple access scheme.

16. A multi-user detection radio receiver wherein an equivalence relation is defined for a set of users based on a set of beam-forming terms to group the users according to their spatial signatures.

17. A method of operating a multi-user detection radio receiver wherein an equivalence relation is defined for a set of users based on a set of beam-forming terms wherein the users are grouped according to their spatial signatures.

* * * * *